(12) United States Patent
Black

(10) Patent No.: US 7,363,505 B2
(45) Date of Patent: *Apr. 22, 2008

(54) SECURITY AUTHENTICATION METHOD AND SYSTEM

(75) Inventor: Gerald R. Black, Southfield, MI (US)

(73) Assignee: Pen-One Inc, Southfield, MI (US)

( * ) Notice: Subject to any disclaimer, the term of this patent is extended or adjusted under 35 U.S.C. 154(b) by 571 days.

This patent is subject to a terminal disclaimer.

(21) Appl. No.: 10/727,208

(22) Filed: Dec. 3, 2003

(65) Prior Publication Data

US 2005/0122209 A1    Jun. 9, 2005

(51) Int. Cl.
*H04L 9/00* (2006.01)

(52) U.S. Cl. .................. 713/186; 382/116; 382/119; 235/382; 726/4; 726/9

(58) Field of Classification Search ................ 382/115, 382/116, 117, 118, 119; 705/64, 16, 67, 705/18; 713/186; 235/379, 382, 380; 356/71; 726/4, 9

See application file for complete search history.

(56) References Cited

U.S. PATENT DOCUMENTS

| | | |
|---|---|---|
| 4,513,437 A | 4/1985 | Chainer et al. |
| 5,103,486 A | 4/1992 | Grippi |
| 5,247,137 A | 9/1993 | Epperson |
| 5,263,742 A | 11/1993 | Koch |
| 5,353,350 A | 10/1994 | Unsworth et al. |
| 5,559,895 A | 9/1996 | Lee et al. |
| 5,619,025 A | 4/1997 | Hickman et al. |
| 5,623,552 A | 4/1997 | Lane |

(Continued)

FOREIGN PATENT DOCUMENTS

WO    PCT/US97/08090    11/1997

(Continued)

*Primary Examiner*—Emmanuel L. Moise
*Assistant Examiner*—Paul E. Callahan
(74) *Attorney, Agent, or Firm*—Gerald R. Black

(57) ABSTRACT

This identity authentication system is used in commercial transactions at a point-of-sale terminal. The system comprises a device for capturing a customer signature (signature pad or a smart pen), a sensor for capturing a biometric property of the customer during the transaction, a local processor, a wireless device carried by the customer, a device reader positioned at the point-of-sale terminal, and a host computer. The customer registers advising the system of a customer account that is to be used for payment. The customer also submits an electronic signature (written script of name) and a digital signature for reference purposes—a fingerprint. The customer is then issued a wireless device, the wireless device having memory. The memory may be an ID card, a credit card, a smart card, a transponder, a barcode, or a combination of these memories. A identifying device reader (such as a card reader, an interrogator, a scanner) is located at the point-of-sale terminal that is compatible with the wireless device. Thereafter, when the customer uses a stylus to submit written data—an electronic signature is generated. Similarly, a sensor in the stylus captures data that is used to generate a digital signature. A reference print is then accessed through the memory in the wireless device carried by the customer. The digital and electronic signatures are then compared against the reference data to authentic identity.

6 Claims, 27 Drawing Sheets

U.S. PATENT DOCUMENTS

Figure 2B:
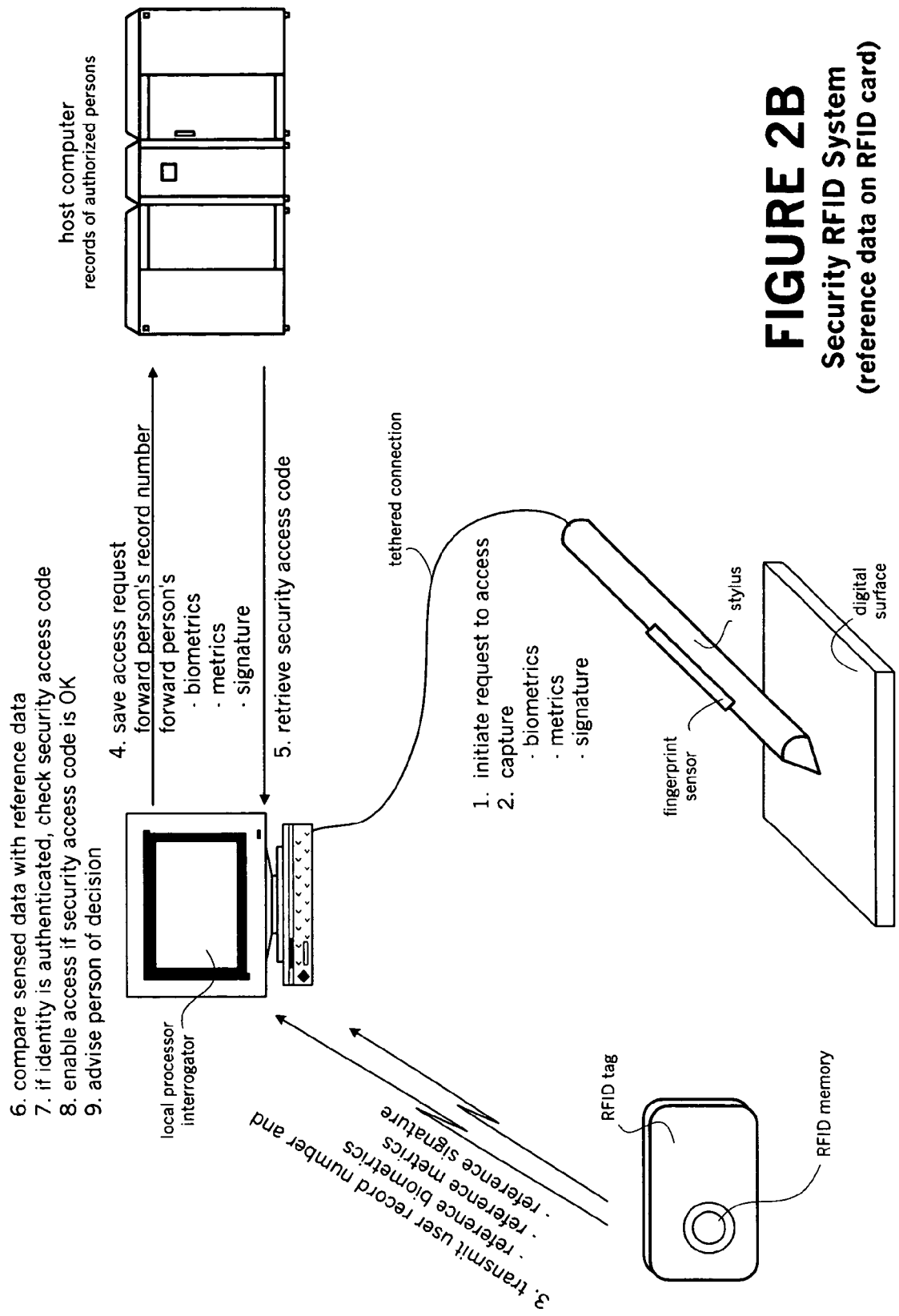

| | | | |
|---|---|---|---|
| 5,652,412 A | 7/1997 | Lazzouni et al. | |
| 5,677,955 A | 10/1997 | Doggett et al. | |
| 5,680,470 A | 10/1997 | Moussa et al. | |
| 5,682,247 A | 10/1997 | Webster et al. | |
| 5,706,349 A | 1/1998 | Aditham et al. | |
| 5,709,746 A | 1/1998 | Ballard | |
| 5,774,571 A | 6/1998 | Marshall | |
| 5,781,661 A | 7/1998 | Hiraiwa et al. | |
| 5,802,199 A | 9/1998 | Pare, Jr. et al. | |
| 5,805,719 A | 9/1998 | Pare, Jr. et al. | |
| 5,834,748 A | 11/1998 | Litman | |
| 5,838,306 A | 11/1998 | O'Connor et al. | |
| 5,848,321 A | 12/1998 | Roh et al. | |
| 5,857,152 A | 1/1999 | Everett | |
| 5,859,420 A | 1/1999 | Borza | |
| 5,862,247 A | 1/1999 | Fisun et al. | |
| 5,869,791 A | 2/1999 | Young | |
| 5,872,834 A | 2/1999 | Teitelbaum | |
| 5,892,824 A | 4/1999 | Beatson et al. | |
| 5,903,225 A | 5/1999 | Schmitt et al. | |
| 5,973,731 A | 10/1999 | Schwab | |
| 5,982,891 A | 11/1999 | Ginter et al. | |
| 5,991,431 A | 11/1999 | Borza et al. | |
| 6,035,403 A | 3/2000 | Subbiah et al. | |
| 6,038,666 A | 3/2000 | Hsu et al. | |
| 6,041,410 A | 3/2000 | Hsu et al. | |
| 6,064,751 A | 5/2000 | Smithies et al. | |
| 6,076,167 A | 6/2000 | Borza | |
| 6,128,602 A | 10/2000 | Northington et al. | |
| 6,140,939 A | 10/2000 | Flick | |
| 6,164,528 A | 12/2000 | Hills et al. | |
| 6,175,922 B1 | 1/2001 | Wang | |
| 6,182,221 B1 * | 1/2001 | Hsu et al. | 713/186 |
| 6,193,152 B1 | 2/2001 | Fernando et al. | |
| 6,202,055 B1 | 3/2001 | Houvener et al. | |
| 6,219,793 B1 | 4/2001 | Li et al. | |
| 6,237,786 B1 | 5/2001 | Ginter et al. | |
| 6,307,956 B1 | 10/2001 | Black | |
| 6,539,101 B1 | 3/2003 | Black | |
| 6,728,881 B1 | 4/2004 | Karamchetty | |
| 6,925,565 B2 | 8/2005 | Black | |
| 6,970,583 B2 | 11/2005 | Black | |
| 7,047,419 B2 | 5/2006 | Black | |
| 7,082,213 B2 | 7/2006 | Black | |
| 2002/0026419 A1 | 2/2002 | Maritzen et al. | |

FOREIGN PATENT DOCUMENTS

| | | |
|---|---|---|
| WO | PCT/US99/07900 | 4/1999 |
| WO | PCT/US00/19652 | 7/2000 |
| WO | PCT/US01/21038 | 7/2001 |
| WO | PCT/US02/16879 | 5/2002 |

* cited by examiner

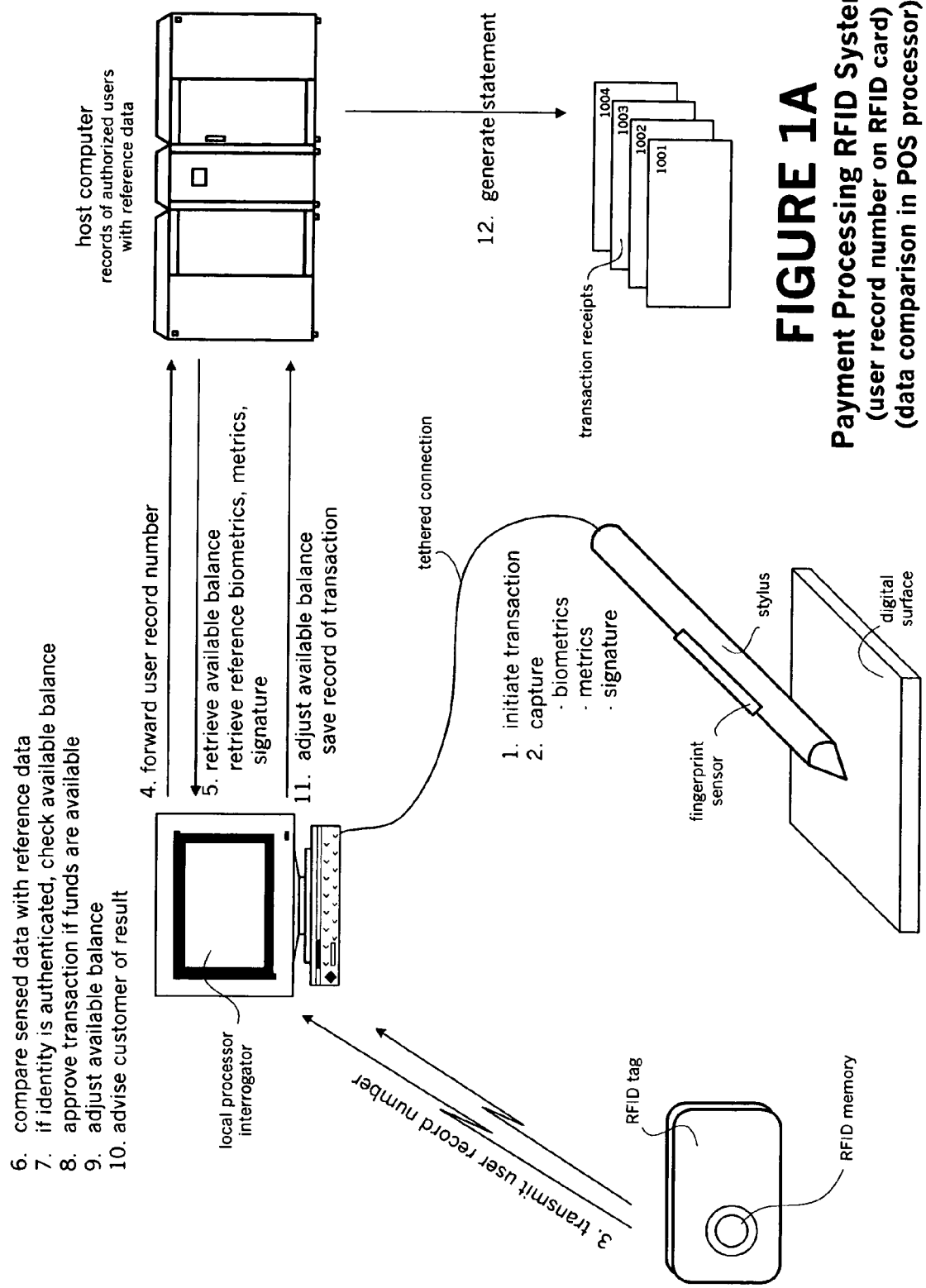

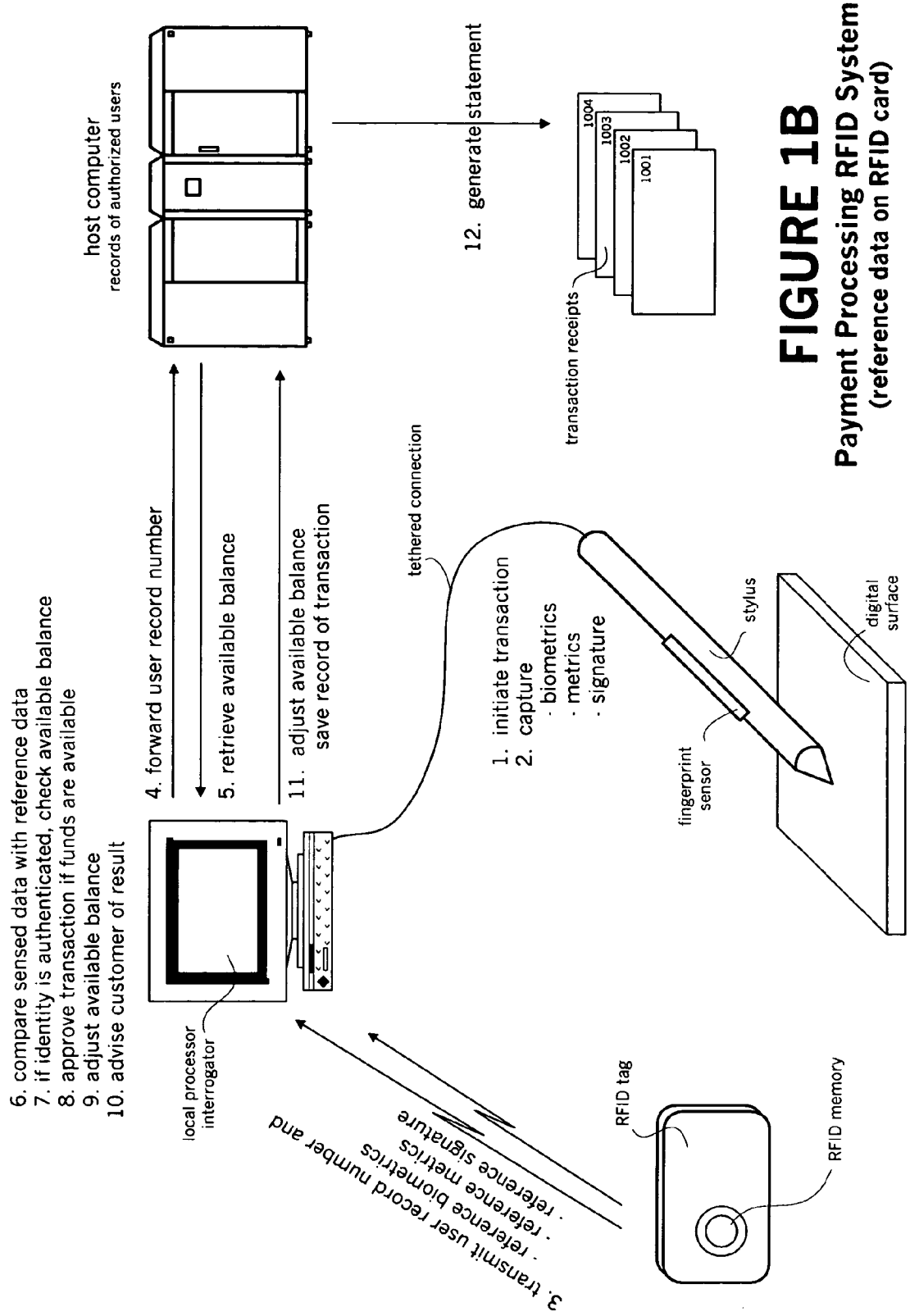

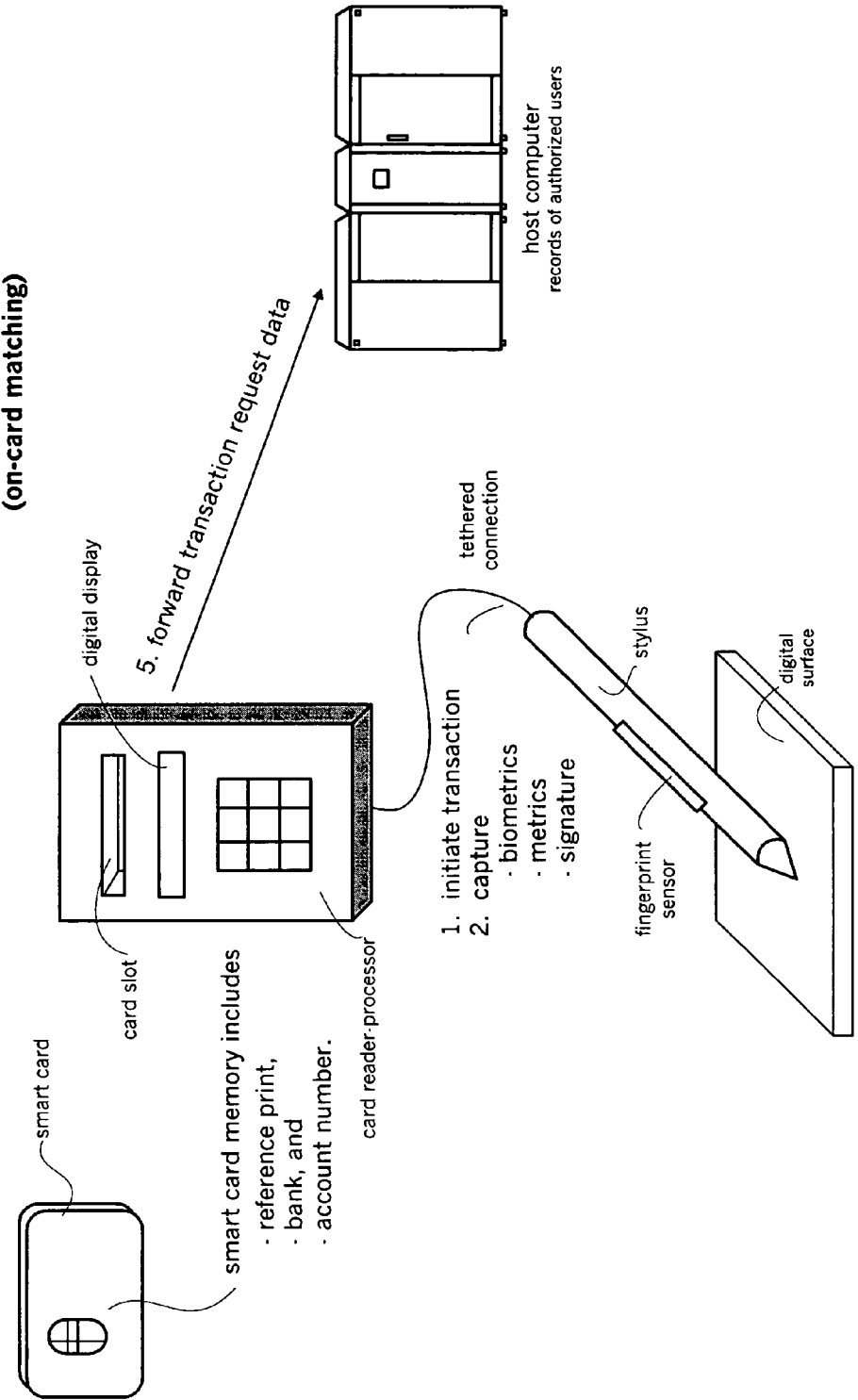

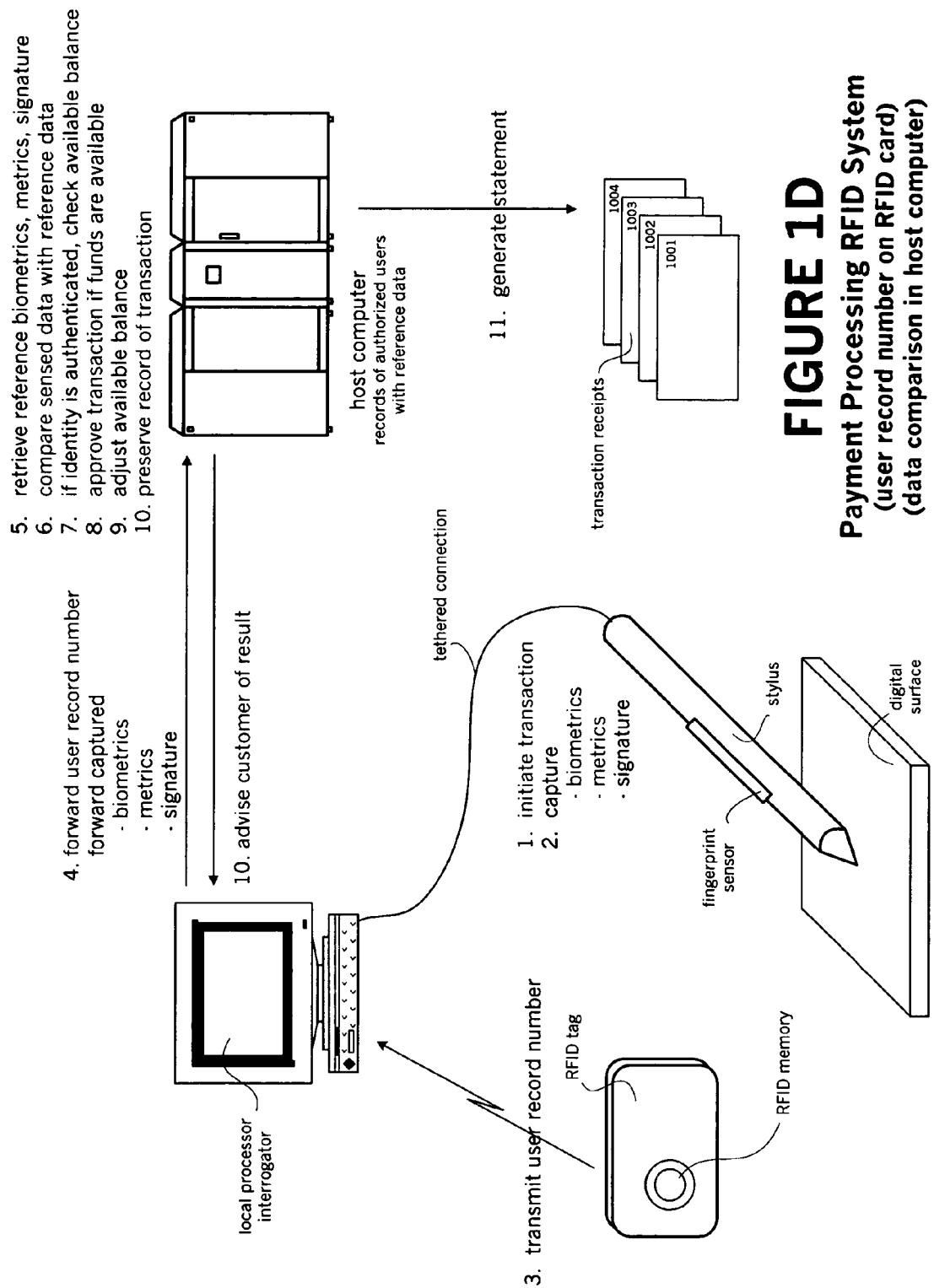

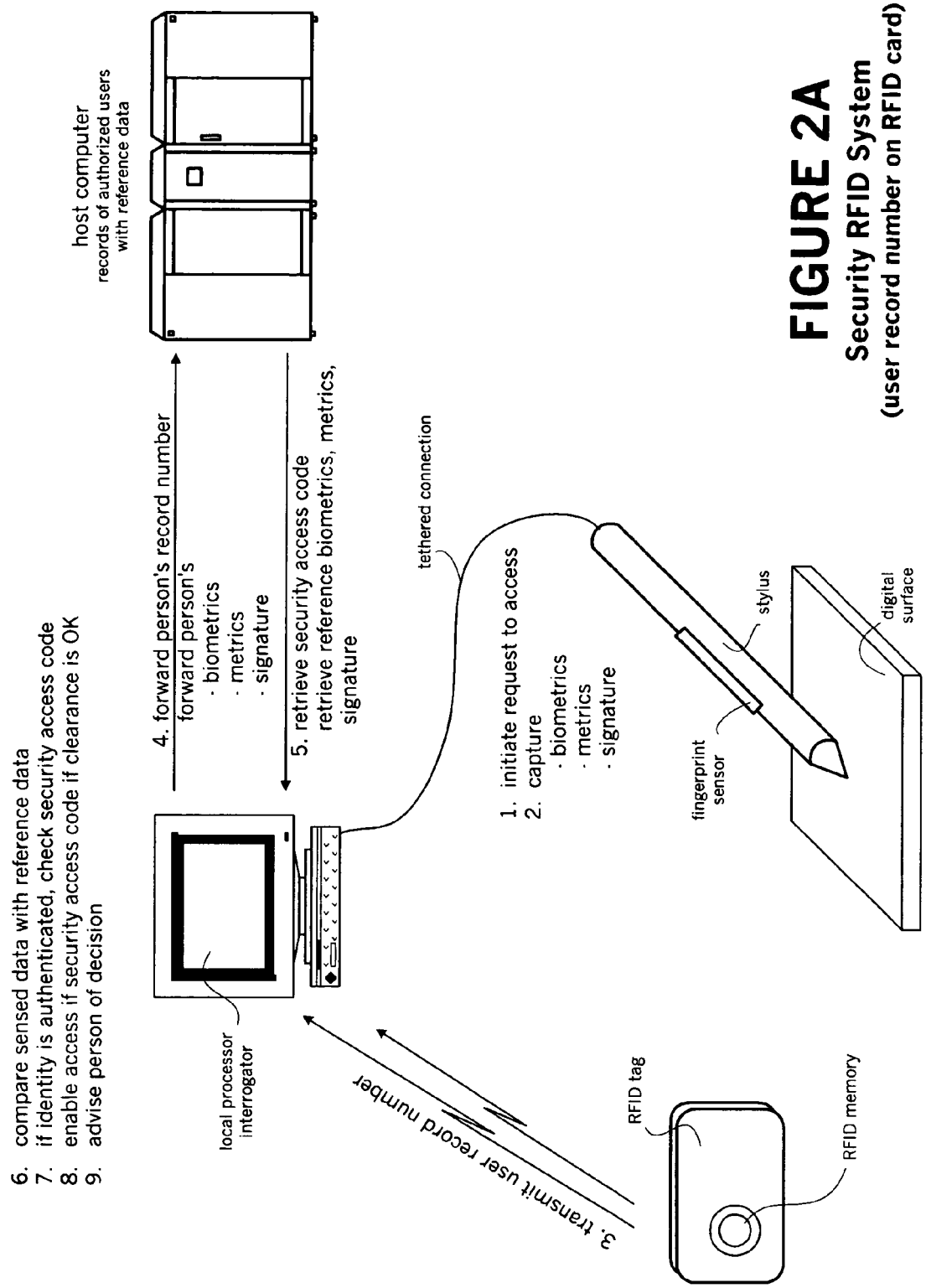

Security RFID System
(reference data on RFID card)

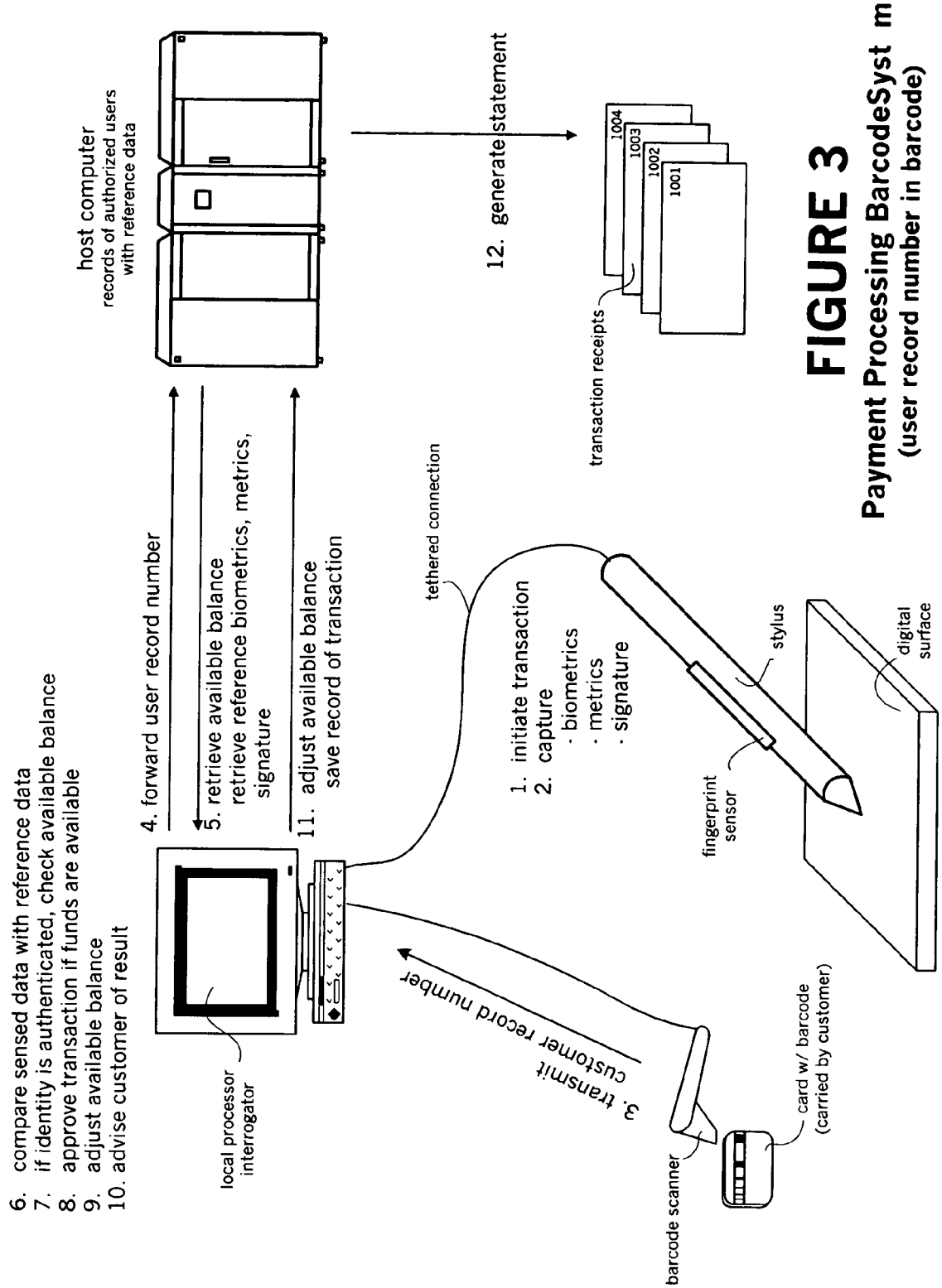

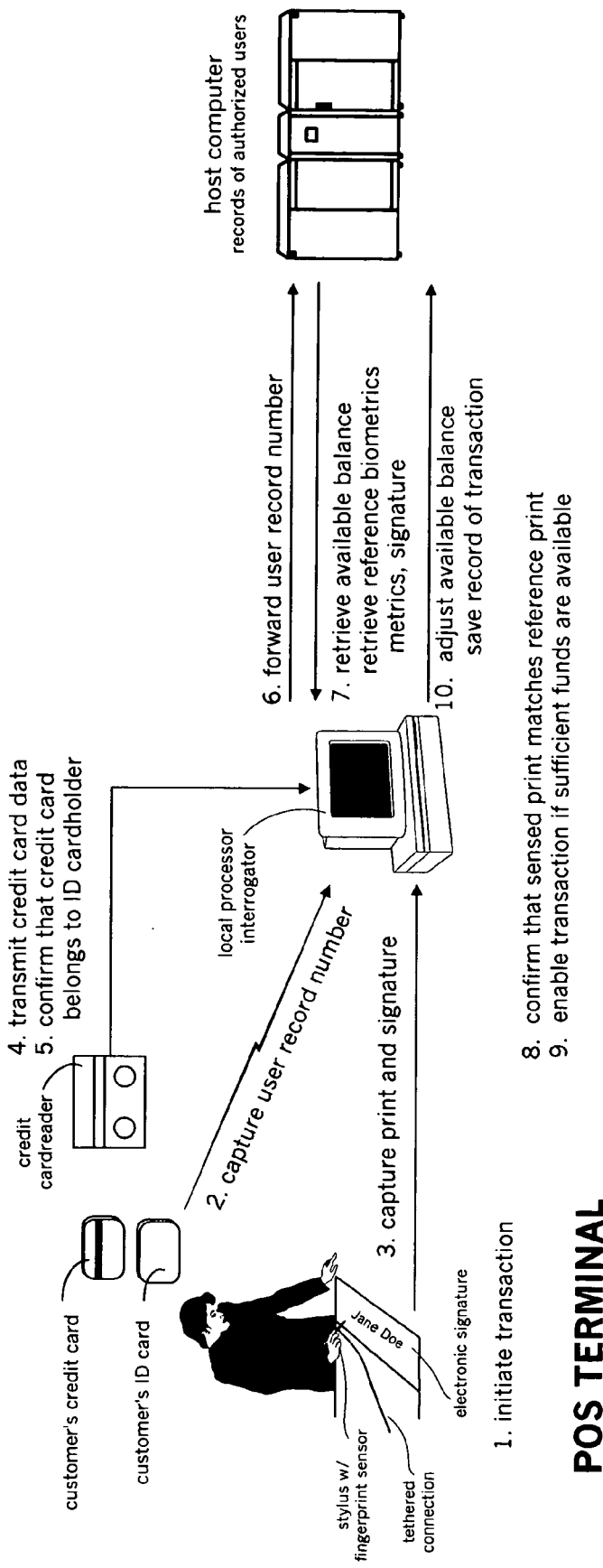

NEW USER

DYNAMIC REGISTRATION REQUEST
(existing user)

Low Security Access

Medium Security Access

High Security Access

Network High Security Request

Access Request to High Security Data w/ Misinformation for Counterfeit Remote

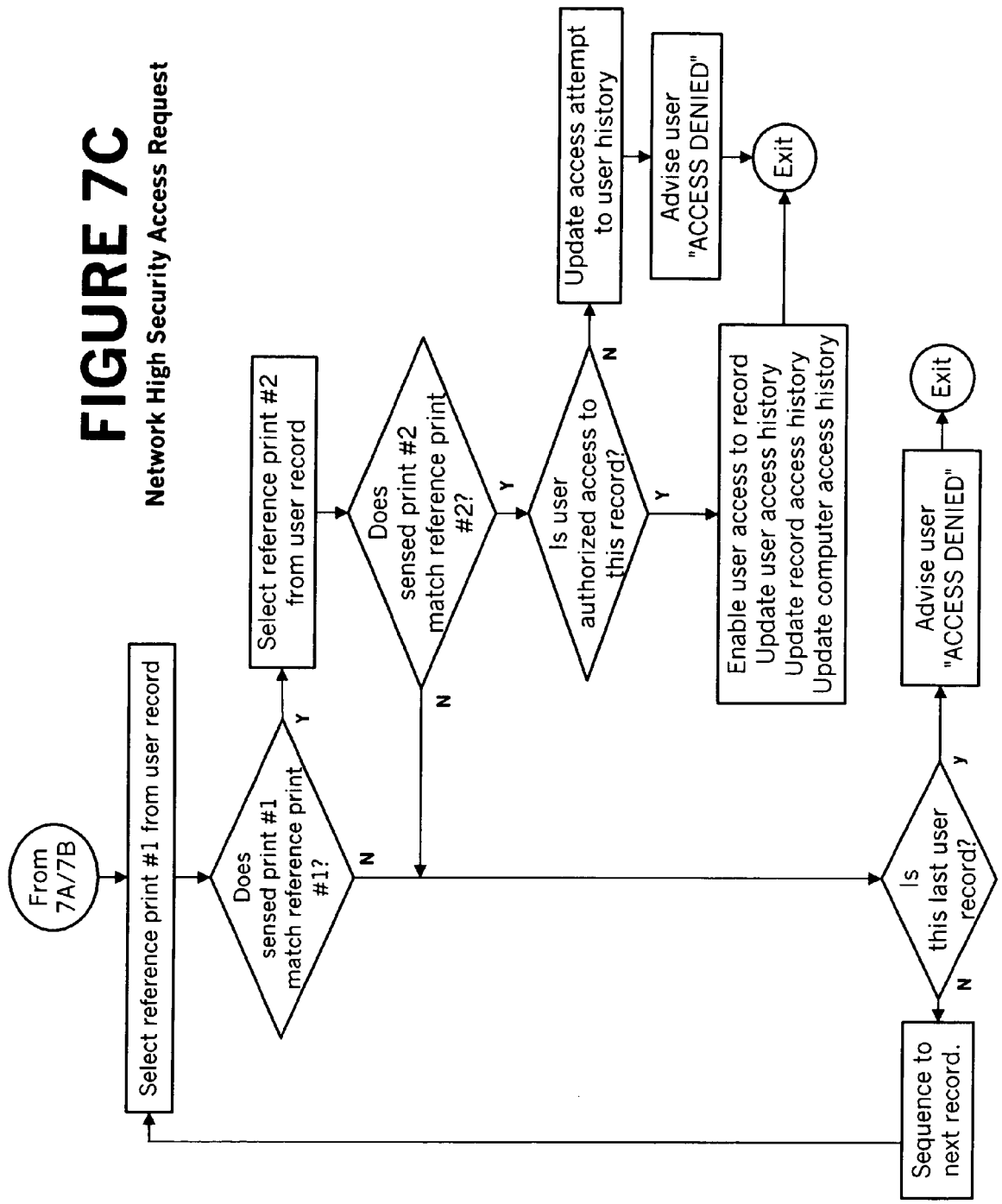

access request
one reference print

| CUSTOMER RECORD NO. |
|---|
| CUSTOMER'S BANK |
| ACCOUNT NO. |
| ACCOUNT BALANCE |
| REFERENCE PRINT |
| REFERENCE SIGNATURE |

FIGURE 10A
RFID MEMORY
W/ REFERENCE DATA IN TRANSPONDER

| CUSTOMER RECORD NO. |
|---|
| CUSTOMER'S BANK |

FIGURE 10B
RFID MEMORY
W/ REFERENCE DATA IN CUSTOMER RECORD

| CUSTOMER RECORD NO. |
|---|
| CUSTOMER'S BANK |
| ACCOUNT NUMBER |
| ACCOUNT BALANCE |
| REFERENCE SIGNATURE |

FIGURE 11A
CUSTOMER DATABASE RECORD
W/ REFERENCE DATA IN TRANSPONDER

| CUSTOMER RECORD NO. |
|---|
| CUSTOMER'S BANK |
| ACCOUNT NO. |
| ACCOUNT BALANCE |
| REFERENCE PRINT |
| REFERENCE SIGNATURE |

FIGURE 11B
CUSTOMER DATABASE RECORD
W/ REFERENCE DATA IN RECORD

```
USER RECORD NUMBER
USER NAME
USER ADDRESS
USER SECURITY CLEARANCE LEVEL
REFERENCE PRINT USER REFERENCE THUMB PRINTS - RIGHT
REFERENCE PRINT USER INDEX FINGER - RIGHT
REFERENCE PRINT PRINT OF USER HAND GEOMETRY - RIGHT
REFERENCE PRINT OF USER FACIAL GEOMETRY
```

FIGURE 14A

USER RECORD

```
SAFETY DEPOSIT BOXES
TELLER WINDOW A
TELLER WINDOW B
TELLER WINDOW C
PERSONNEL RECORDS
EMPLOYEE EMAIL
WORKING HOURS BUILDING ACCESS
OFF-HOUR BUILDING ACCESS
PARKING LOT ACCESS
BANK SAFE
CORPORATE PAPERS
PENDING LITIGATION
```

FIGURE 14B

SECURITY ACCESS SITES

ID CARD W/ TRANSPONDER

ID CARD w/ MAGNETIC STRIPE

ID CARD W/ BARCODE

ID CARD W/ TRANSPONDER AND BARCODE

ID CARD w/ MAGNETIC STRIPE TRANSPONDER AND BARCODE

ID CARD W/ MAGNETIC STRIPE AND BARCODE commercial paper w/ RFID element

REGULAR SECURITY

HIGH SECURITY

SECURITY AUTHENTICATION METHOD AND SYSTEM

This application claims priority from U.S. patent application Ser. No 10/032,591 filed on Dec. 7, 2001, now U.S. Pat. No. 7,047,419; U.S. patent application Ser. No. 09/976,080 filed on Oct. 12, 2001, now U.S. Pat. No 7,082,213; U.S. patent application Ser. No. 09/865,756 filed on May 25, 2001, now U.S. Pat. No. 6,970,583; and U.S. patent application Ser. No. 09/865,638 filed on May 25, 2001, now U.S. Pat. No. 6,925,565.

FIELD OF THE INVENTION

The invention relates generally to various systems for verifying the identification of a person, and more particularly, where the person carries a wireless device for use at point-of-sale terminals, the wireless device having a memory in for example, an ID card, a credit card, a smart card, a transponder, a barcode, or a combination of such.

BACKGROUND OF THE INVENTION

Many identification systems are known in the art. In some cases, a photograph of a subject or his fingerprint pattern is affixed to an identification card. In other approaches, various methods are employed for storing image or password information in a magnetic stripe or in an optically encoded image or pattern, which is physically part of the identification card. Still other approaches utilize a "smart card" having its own semiconductor memory capability for information storage.

U.S. Pat. No. 6,175,922 (Wang) discloses an electronic transaction system for completing a transaction request at a point-of-sale terminal using a portable electronic authorization device carried by a user. The device first receives digital data representing the transaction request. The electronic authorization device provides information regarding an ability to approve the transaction request. When the transaction is approved, the electronic authorization device receives additional data representing the electronic service authorization token.

U.S. Pat. No. 6,140,939 (Flick) discloses a biometric security system for automobiles. The control system includes a controller for learning a unique biometric characteristic of an individual to define a learned individual capable of causing performance of a function associated with the vehicle. The vehicle function control system includes a biometric characteristic sensor, and a controller at the vehicle for controlling a vehicle function responsive to the biometric characteristic sensor.

U.S. Pat. No. 5,857,152 (Everett) discloses an electronic system for toll payment. The system identifies an electronic purse and effects value transfer over a communication system without the need for the vehicle to stop. The system provides for toll payment by use of a communication device and an electronic purse coupled to the device. The remote communication system communicates with mobile devices to effect toll payments by exchanging cryptographically secure messages.

U.S. Pat. No. 5,706,349 (Aditham et al.) discloses a system for authenticating remote users in a distributed environment. A token is initially issued to a remote user once a security mechanism determines that the remote user is who he claims to be. Prior to access to the a connection between a remote user and an application server, the system verifies that a token associated with a connection request was issued by the security mechanism.

U.S. Pat. No. 6,202,055 (Houvener, et al.) discloses a system for processing a financial instrument. A customer at a identification terminal initially submits the instrument—perhaps a check. The checking account number is communicated to a remote database containing digital photographic images of authorized users of checking accounts. The remote database is searched and any photographic images associated with the checking account number are transmitted to the identification terminal. The images are displayed and compared to the physical appearance of the customer. The on-site employee then determines if at least one of the displayed digital matches the appearance of the person initiating the transaction.

U.S. Pat. No. 5,903,225 (Schmitt, et al.) discloses an access control system with fingerprint sensor enrollment. The system includes a station for enrolling a person as authorized based upon the sensed fingerprint. The system also includes a wireless device that is carried by the authorized person, and an access controller for granting access to an authorized person. The wireless device cooperates with the enrolling station to store data for an authorized person based upon the sensed fingerprint. The authorized person bearing the wireless device is unobtrusively granted access by approaching the access location.

U.S. Pat. No. 5,973,731 (Schwab) discloses an identification system that provides interactive communication of text and image information between a central server and multiple remote terminals. The central server maintains a separate, centralized database of data-compressed images of the subject individuals, and subsequently transmits the data-compressed images to local terminals, on demand, during the transactions. The image may include a copy of the authorized signature, which then is used by the transaction terminal to compare to a scanned image of the signature on the authorization slip.

While a written signature is still regarded as the preferred way for a person to convey approval and a legal commitment, there still remains a need to confirm absolutely that can assure that the customer is the person authorized to make a commitment.

What is needed is a system that will utilize wireless technology (primarily) in commercial transactions of any value that is acceptable to all parties—that captures a digital signature (which is the international standard of identification) at the same time that the electronic signature (the written text) is captured, the combined signature being irrefutable; a pen-based system that is both compatible with card-based systems and independent of such systems.

SUMMARY OF THE INVENTION

The system of the present invention addresses these needs. For purposes herein, a list of key terms are hereafter set forth to clarify the scope of the authenticated payment system of the present invention.

TRANSPONDER is a wireless device that is a receiver-transmitter. The transponder is part of a transponder system—the system also including an interrogator. The transponder is capable of accepting the challenge of the interrogator by transmitting an appropriate reply. The transponder receives and transmits data in a wireless manner, generally through low frequency radio waves. The transponder is generally an ID card, a keytag, a wireless phone, a pda, or some other device that can be carried by a customer in a purse, wallet, keychain, or pocket. The transponder may be active or passive. This definition expressly excludes any data transmission by means of swiping a card through or injecting a card into a conventional cardreader.

STYLUS refers to any device that is compatible with either the hand or finger of the user for purposes of making a marking on an essentially flat surface. The flat surface may be a digital surface or a piece of paper. While the drawings depict a conventional shape of a stylus, other shapes and designs are also included within the scope of the present invention such as any attachment or thimble-like device for a finger or any implement that can be held with a hand for such purpose. The stylus may or may not include an ink cartridge.

DYNAMIC REGISTRATION refers to a process where an existing customer can register for identity into a new system by participating in a conventional transaction. For example, if an electronic signature or digital signature is to be used for reference purposes, such signature is captured when the customer grasps the stylus and signs her name. The registration is seamless and essential invisible to the customer.

The authenticated payment system of the present invention comprises a wireless device carried by the customer, a device reader for accessing customer data through the wireless device, a device for generating an electronic signature, a sensor for capturing a digital signature during the course of the commercial transaction, a point-of-sale processor for processing electronic signature data and digital signature data from the device reader, and a host computer in digital communication with the point-of-sale processor.

The method for authenticating a payment of the present invention comprises a customer approaching a point-of-sale terminal with goods to be purchased, the customer generating an electronic signature as an expression of intent to commit to the commercial transaction, capturing a digital signature of the customer when the electronic signature is being generated, comparing the captured digital signature of the customer against a reference digital signature, and approving the transaction whenever a predetermined threshold for the authentication has been met and the customer has sufficient funds to cover the transaction.

A first preferred embodiment of the identity verification system of the present invention is for use in commercial transactions. The system comprises a host computer, an interrogation device, a transponder device, and a stylus.

The host computer has access to data that links the customer with the customer's payment account. The interrogator is linked to the host computer disposed at the point-of-sale terminal. The transponder is wireless and is carried by the customer, and transmits data to the interrogator upon request. The data transmitted pertains to the identity of the customer. The stylus is attached to the point-of-sale terminal and includes a sensor disposed in the stylus grip. The sensor captures a digital signature of the customer while the customer signs her name. Access to the customer's payment account is only enabled when the sensed digital signature matches a reference digital signature.

For use in commercial transactions at a point-of-sale terminal, a customer registers selecting a customer account that is to be used for payment. The customer also submits a digital signature for reference purposes—preferably, a fingerprint. The customer is then issued a transponder that links the customer to the customer account and to the reference digital signature. When the customer is at the point-of-sale terminal for making payment, an interrogator disposed at the point-of-sale terminal transmits a radio signal requesting identity verification. The wireless transponder submits data to the interrogator. Thereafter, when the customer uses a stylus to submit written data (such as a signature), a sensor in the stylus makes incidental capture of biometric data that enables the interrogator to confirm customer identity. Similarly, the system can be used to verify identity when the customer wants to cash a personal check.

Positioned at the center of the process is a stylus with any of a number of biometric or with one or more metric sensors, that enable an incidental capture of data relative to identity verification while the stylus is being used. The identity verification processes of the present invention can be used at point-of-sale terminals, in various controlled environments, to access a computer network, in applications involving pen-based computers and smart-pens, for e-commerce, conventional writing implements, and multi-purpose writing implements.

While the systems set forth herein are described in conjunction with point-of-sale terminals for purposes of illustration, it is understood that the principles set forth herein are all applicable to a broad range of other activities where a writing or signature are required or preferred, such as Internet and Intranet commerce, access control, government activities (voting, drivers' registration, receipt of government benefits) and for use in controlled environments (such as hospitals, and banks).

Various methods of generating a digital signature may be employed:

PCT Application No. PCT/US99/17900 entitled "Identification Confirmation System" filed on Apr. 7, 1999; U.S. patent application Ser. No. 09/490,687, entitled "Writing Implement and Identity Verification Systems" filed on Jan. 24, 2000; U.S. patent application Ser. No. 09/535,411, entitled "Method for Identity Verification" filed on Mar. 20, 2000; and PCT Application No. PCT/US00/19652 entitled "Identity Authentication System and Method" filed Jul. 18, 2000 by the applicant disclose the use of fingerprint sensors disposed in the barrel of a stylus used to generate an electronic signature as the preferred digital signature.

U.S. Pat. No. 6,064,751 (Smithies) discloses a method of generating a digital signature by the use of various metric and biometric sensors disposed in the barrel of the stylus. A computer-based system captures and verifies an electronic handwritten signature. The system includes a stylus with a plurality of sensors that capture biometric properties of the user, and a database of signature templates storing verified signature information. At the time of signing, a digital signature is generated comprising certain features of the writer during the act of signing, such as the size, shape and relative positioning of the curves, loops, lines, dots, crosses and other features of the signature being inscribed, as well as the relative speed at which feature is being imparted. A captured composite digital signature of signature measurements are compared with a reference set of measurements stored to obtain a similarity score.

The interrogator is in digital communication with a host computer—the interrogator being disposed at a point-of-sale terminal. The wireless device is preferably a transponder. The stylus can be attached to a point-of-sale terminal, via a pen-based computer or a signature pad. A digital signature, such as a fingerprint, is captured during a registration process and stored in a file associated with the registrant or in the wireless device.

The customer registers advising the system of a customer account that is to be used for payment. The customer also submits an electronic signature (written script of name) and a digital signature for reference purposes—a fingerprint. The customer is then issued a wireless device, the wireless device having memory. The memory may be an ID card, a credit card, a smart card, a transponder, a barcode, or a combination of these memories. A identifying device reader (such as a card reader, an interrogator, a scanner) is located at the point-of-sale terminal that is compatible with the wireless device. Thereafter, when the customer uses a stylus to submit written data—an electronic signature is generated. Similarly, a sensor in the stylus captures data that is used to generate a digital signature. A reference print is then accessed through the memory in the wireless device carried by the customer. The digital and electronic signatures are then compared against the reference data to authentic identity.

The stylus includes one or more fingerprint sensor that captures an image of a finger of the customer when the stylus is grasped. While fingerprint sensors are used herein for purposes of illustration it is expressly understood that the principles of this invention are also applicable to sensing of DNA and other biotech properties—that involve cell capture or cell analysis sensors. During routine usage of the stylus, the sensor captures the data necessary to compare with the digital signature to determine identity verification. The preferred embodiment of the authenticated commercial transaction system of the present invention is compatible with the following systems:

Fingerprint sensor in something other than stylus (card reader, point-of-sale counter, card)
    Stylus w/fingerprint sensors attached to point-of-sale
        Credit cards
        Stored value, ATM, check cards
        Reference print, Bank, and Account number in card, keytag, or wallet
        Bank and Account number in card, keytag or wallet
        Personal identifier in card, keytag, or wallet
    Smart-Pen w/fingerprint sensors attached to point-of-sale
        Credit cards
        Stored value, ATM, check cards
        Reference print, Bank, and Account number in card, keytag, or wallet
        Bank and Account number in card, keytag or wallet
        Personal identifier in card, keytag, or wallet
    Wireless Smart-Pen w/fingerprint sensors carried by customer
        Reference print, Bank, and Account number in smart-pen
        Bank and Account number in smart-pen
        Personal identifier in smart-pen For a more complete understanding of the security authentication system and method of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention. Throughout the description, like reference numbers refer to the same component throughout the several views.

DETAILED DESCRIPTION OF THE DRAWINGS

Figure 5A:
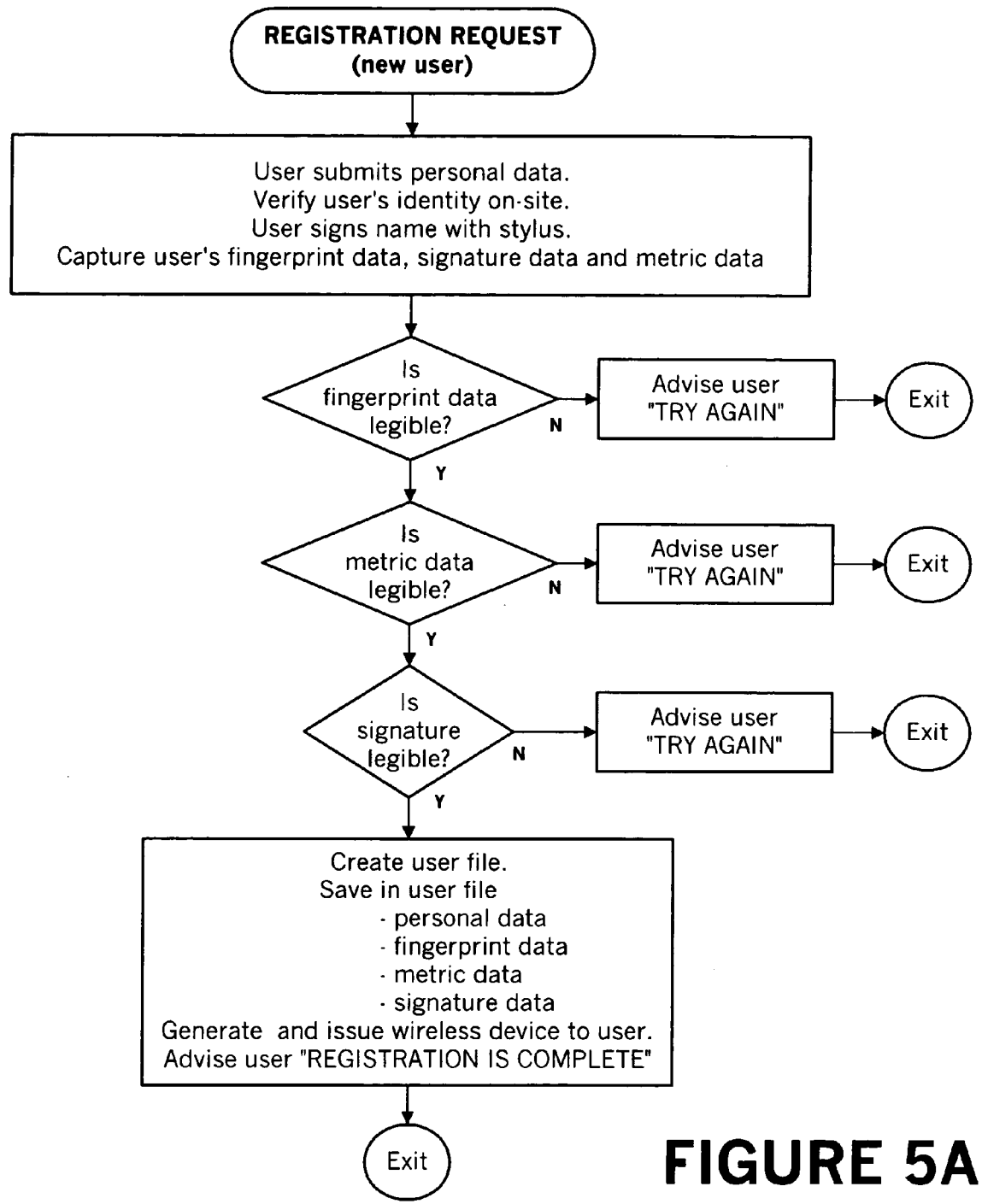
Figure 5B:
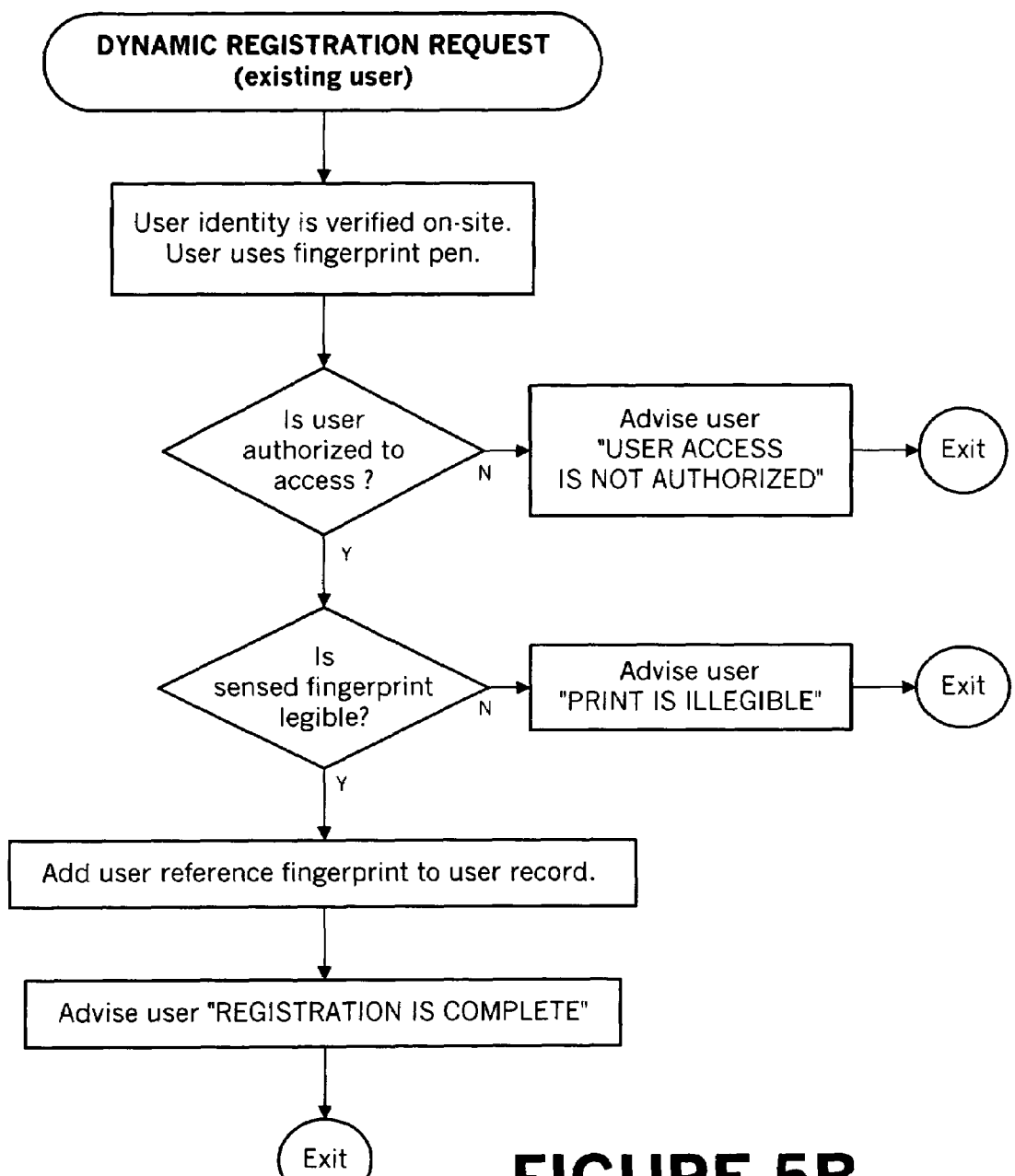
Figure 6A:
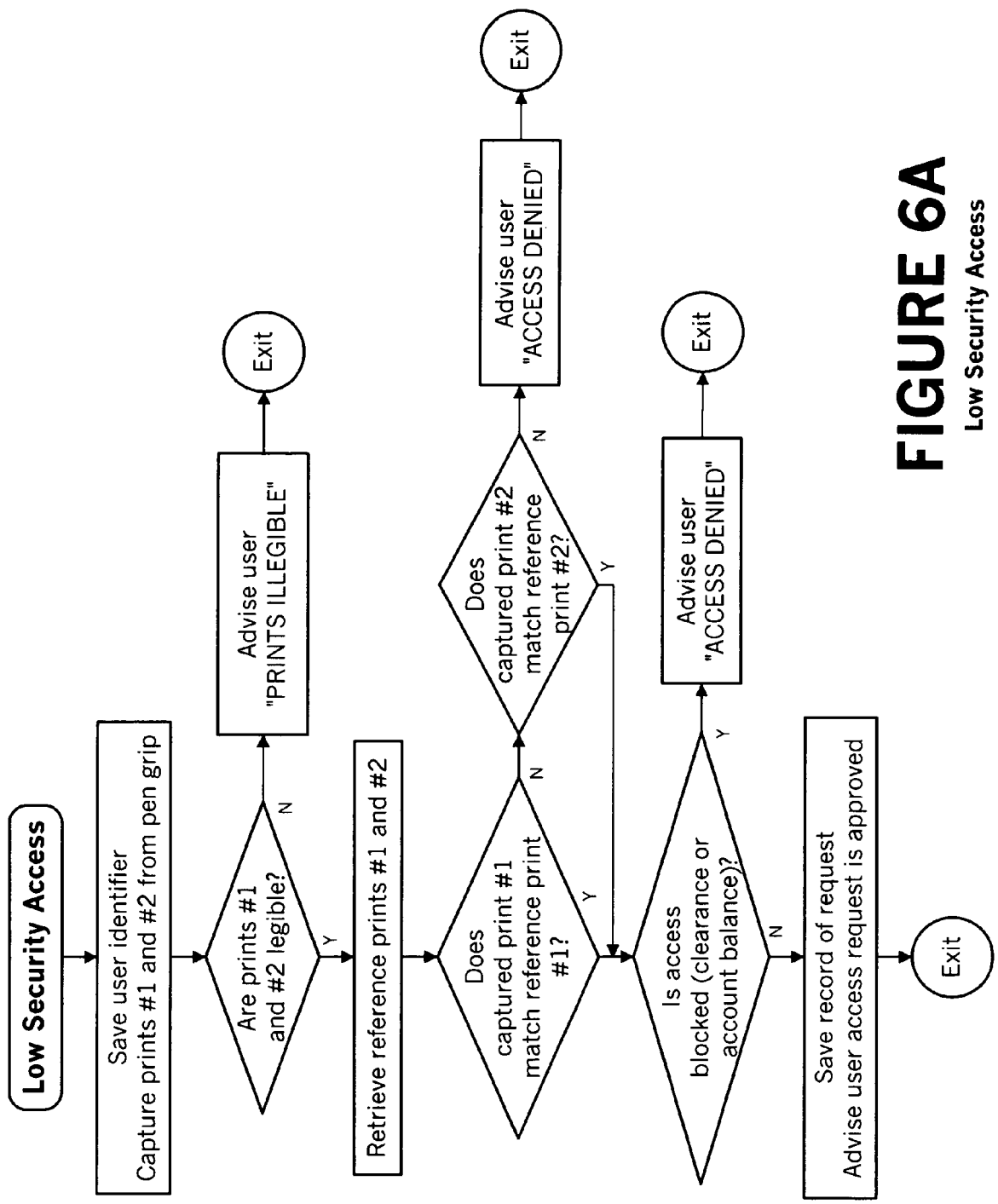
Figure 6B:
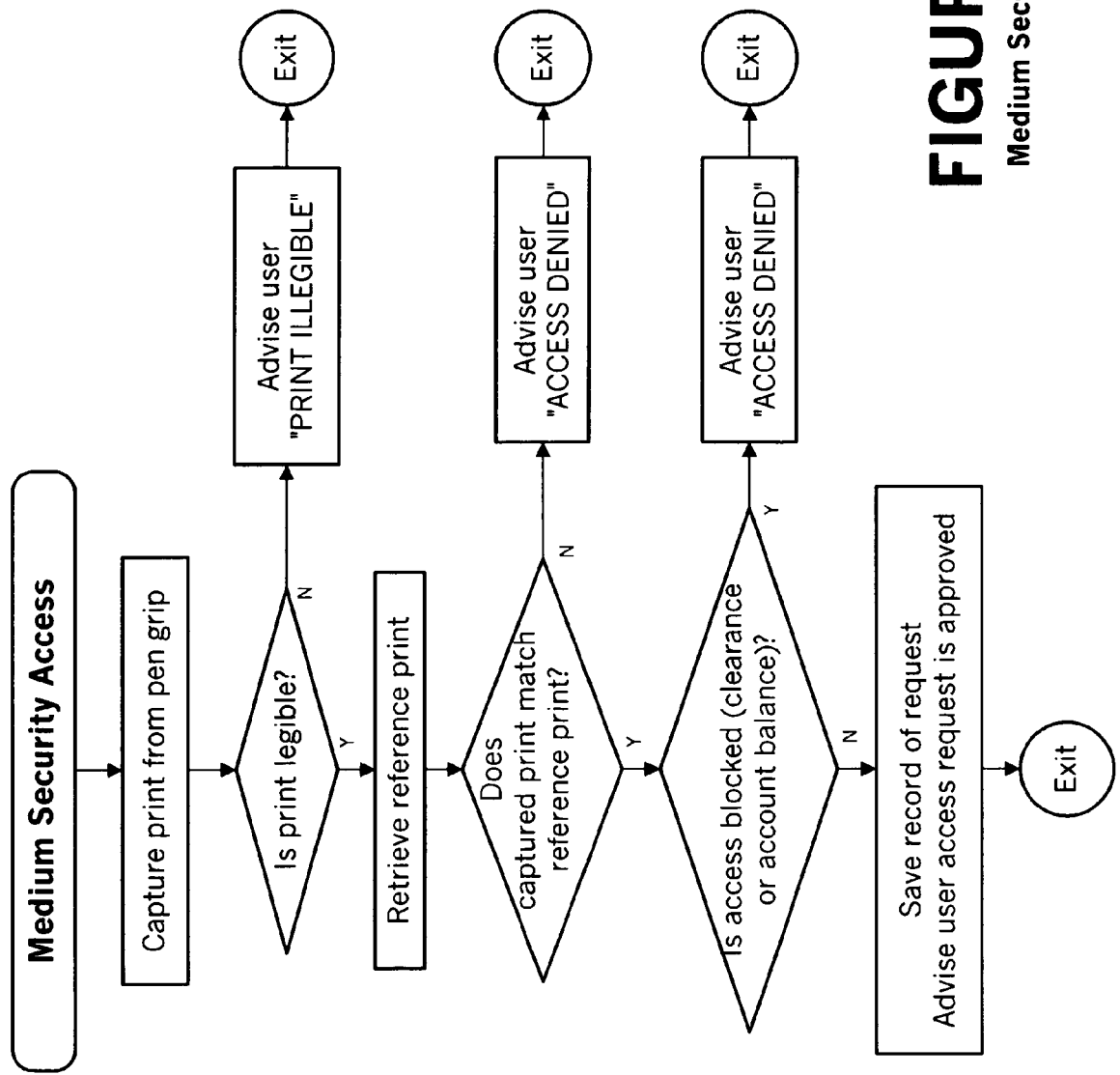
Figure 6C:
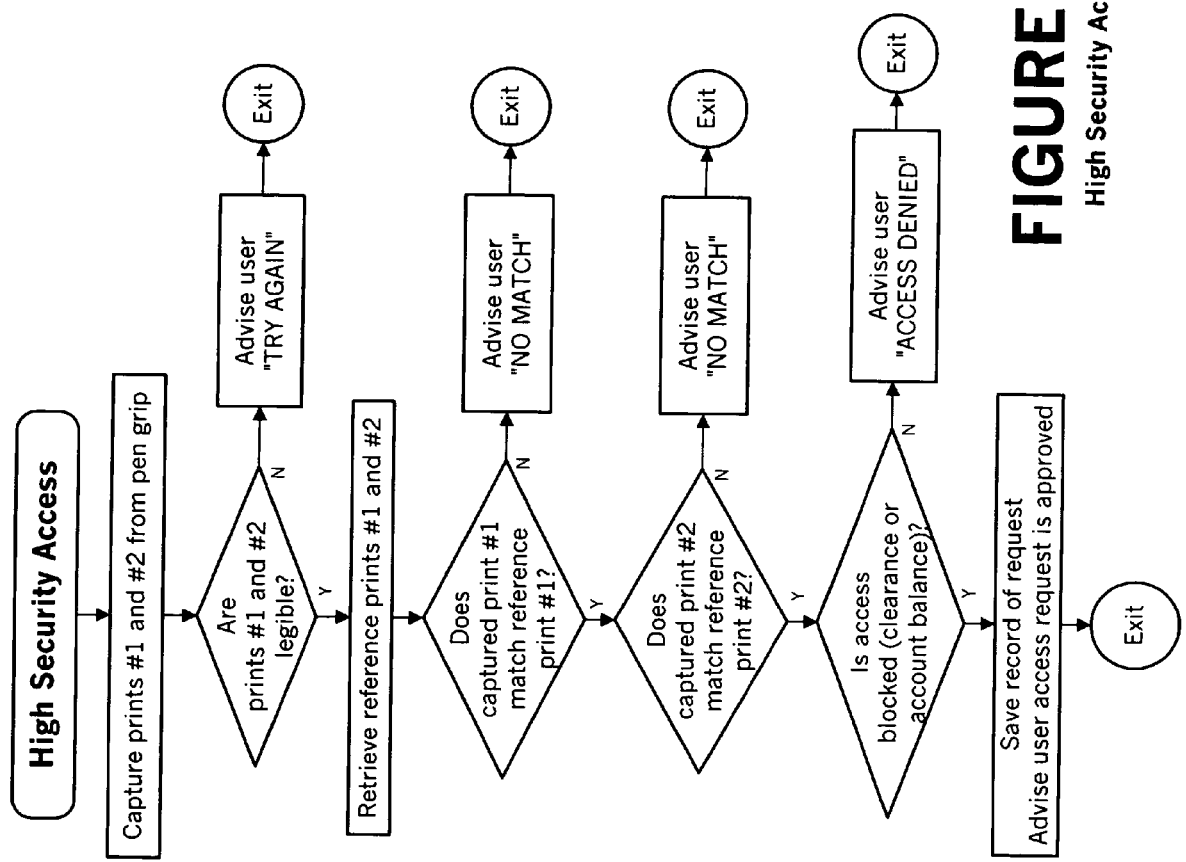
Figure 7A:
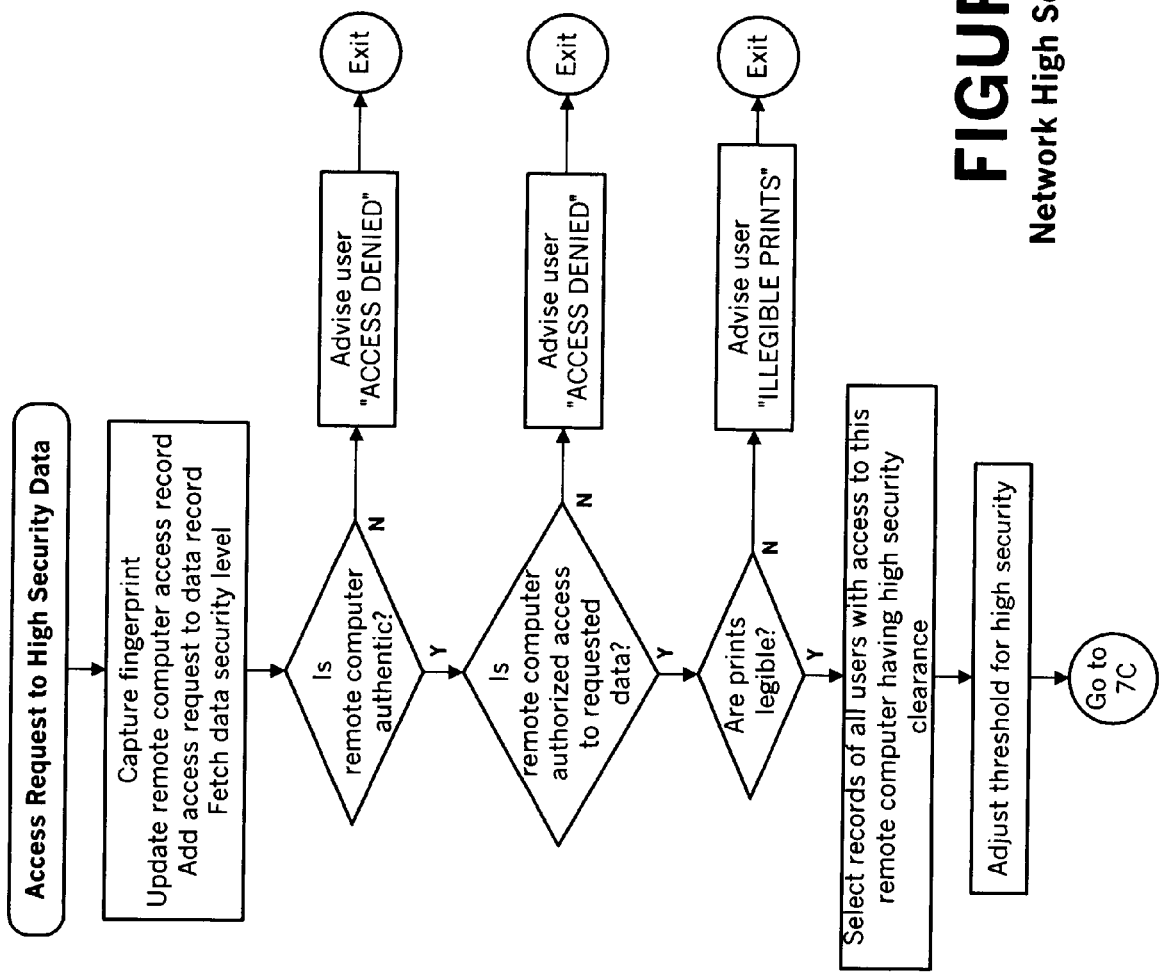
Figure 7B:
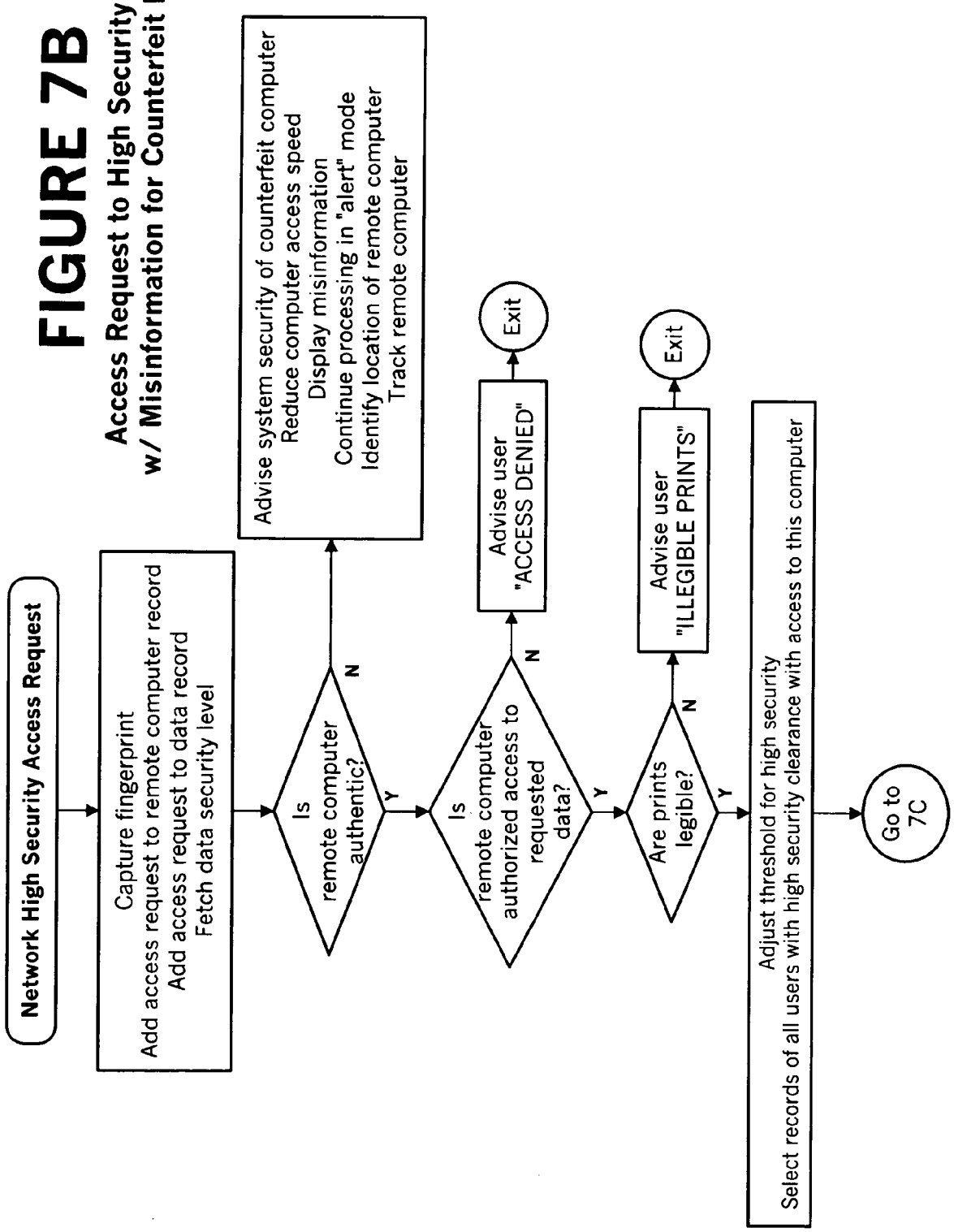
Figure 8:
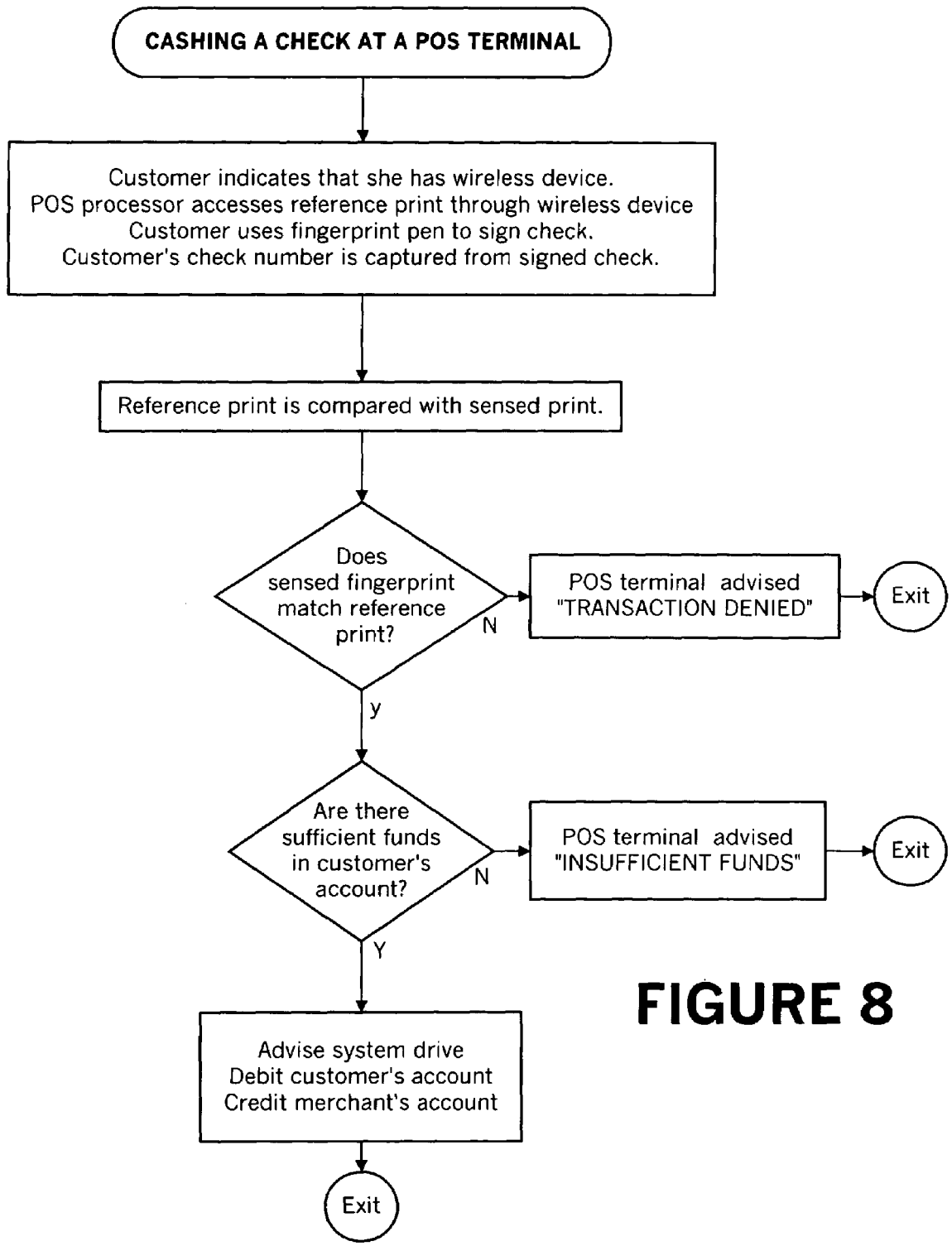
Figure 9:
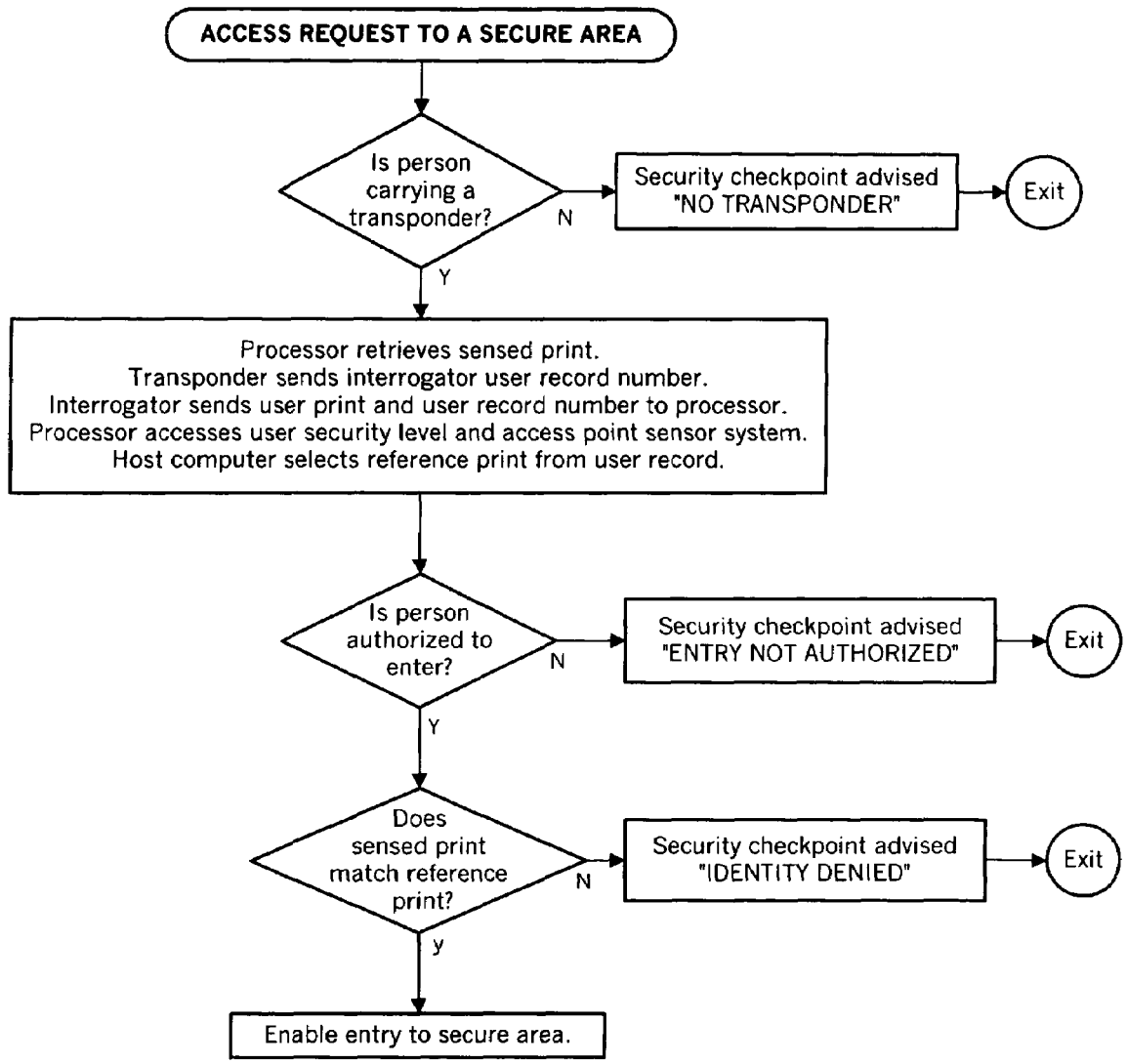
Figure 12A:
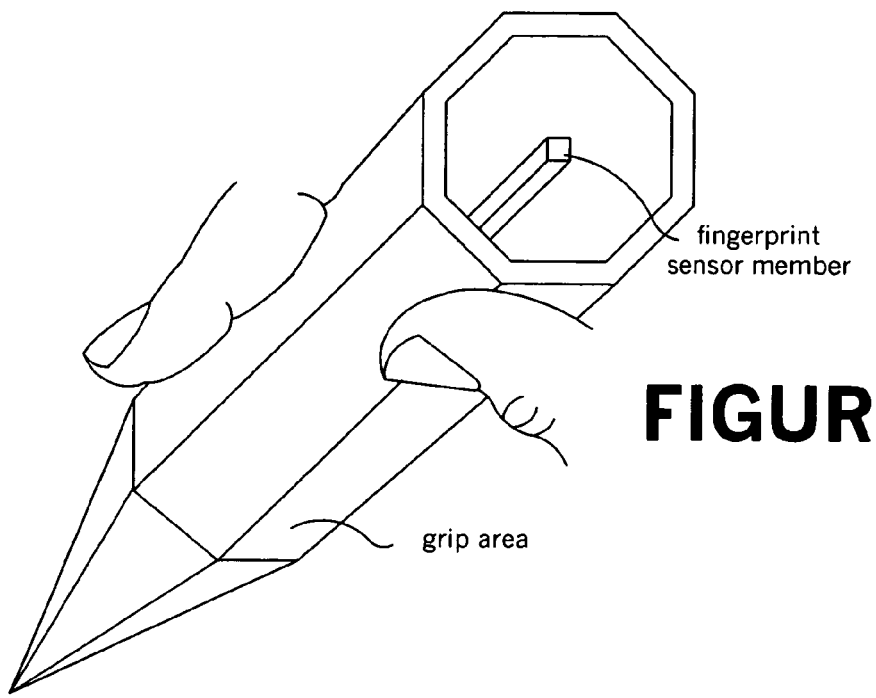
Figure 12B:
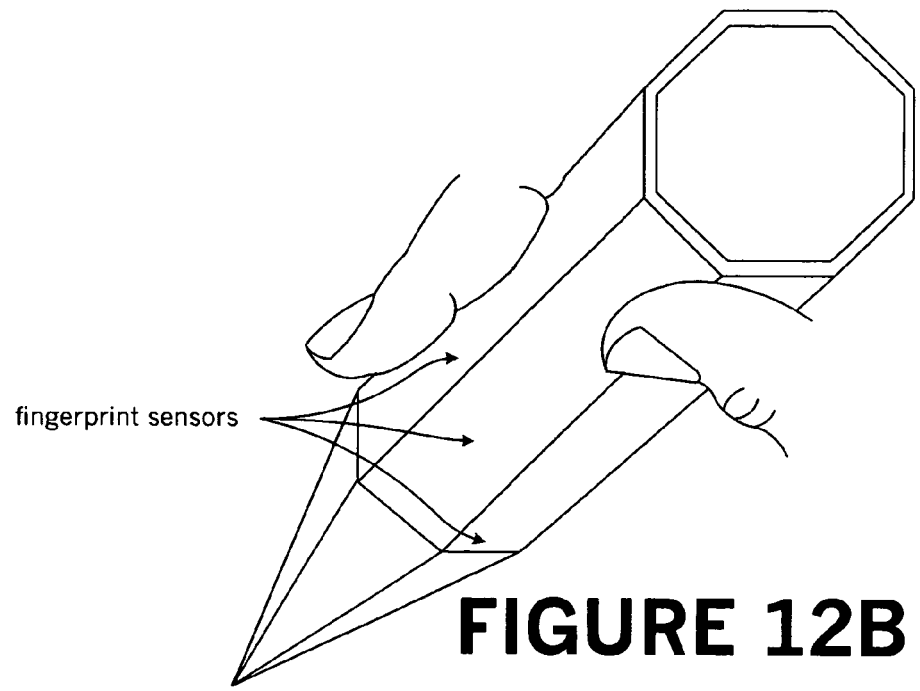
Figure 13A:
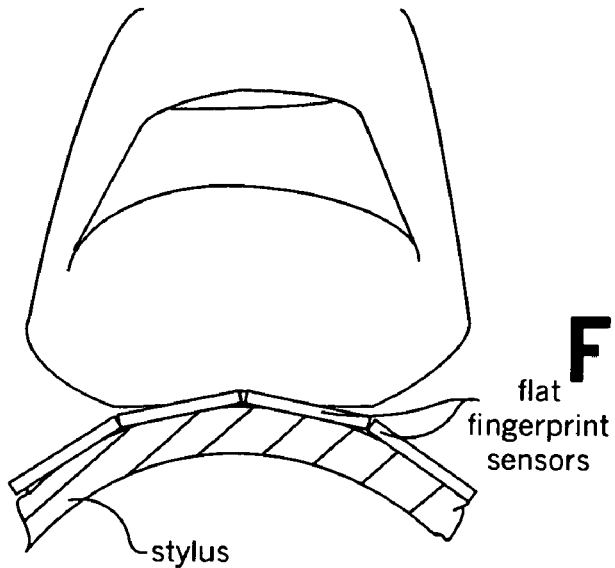
Figure 13B:
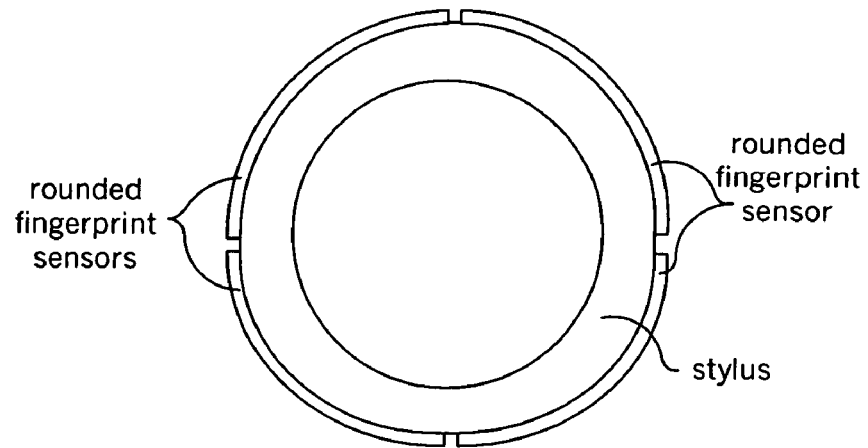
Figure 15A:
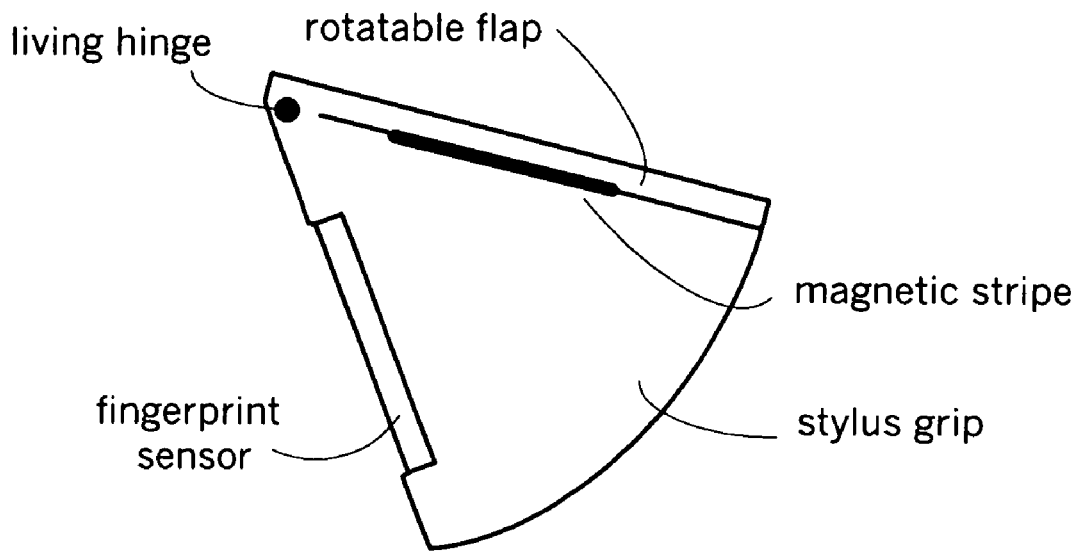
Figure 15B:
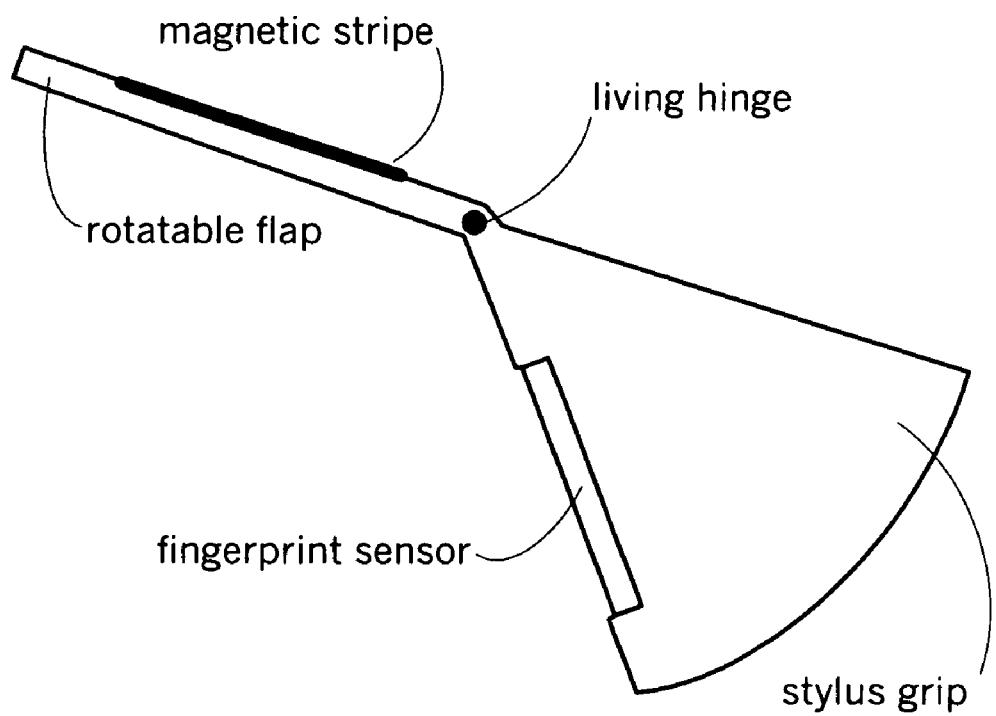
Figure 16A:
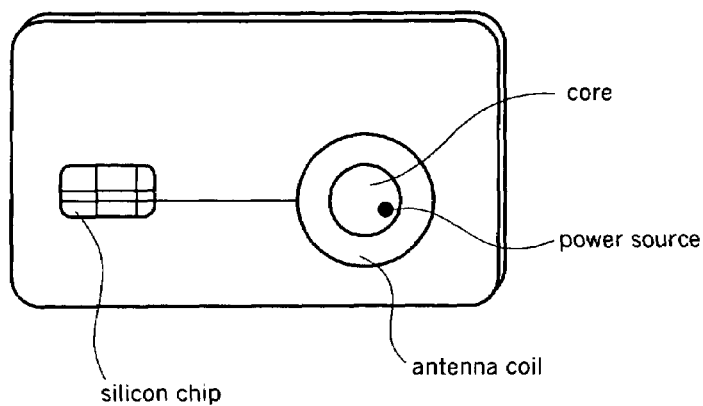
Figure 16B:
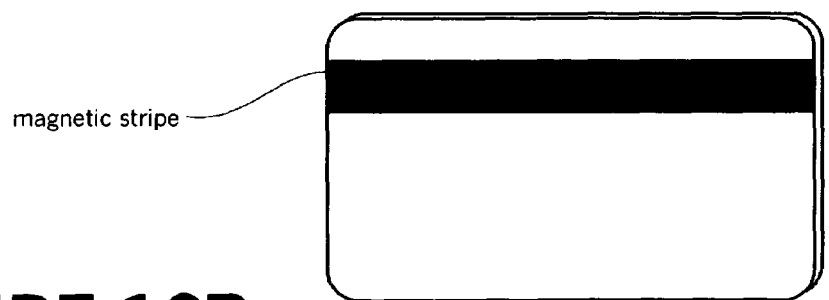
Figure 16C:
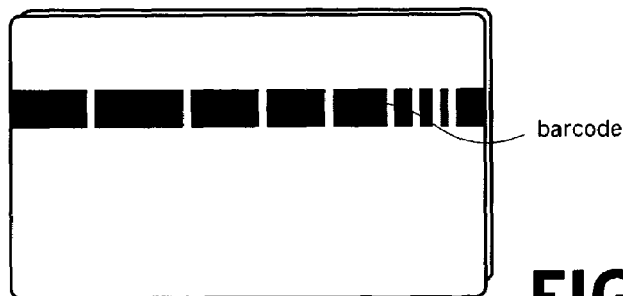
Figure 16D:
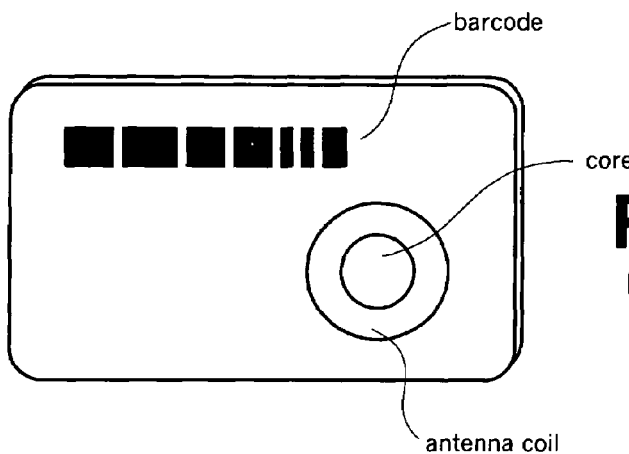
Figure 16E:
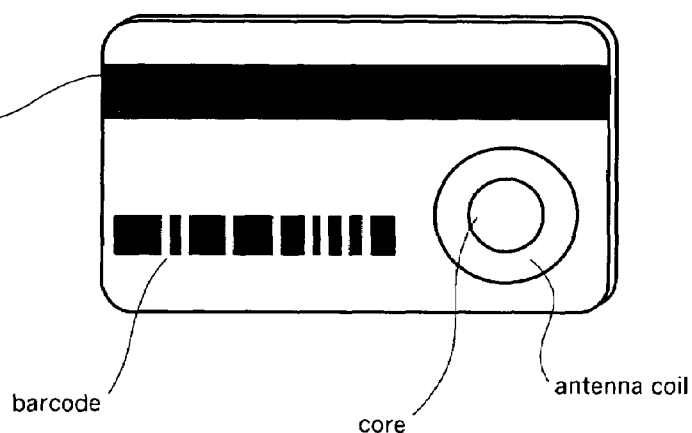
Figure 16F:
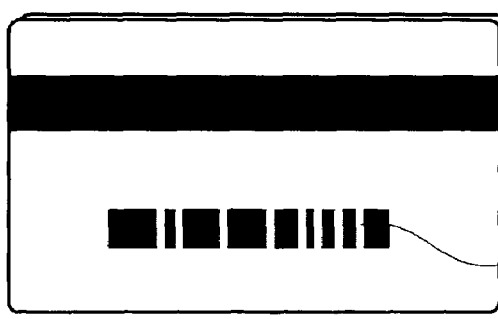
Figure 17:
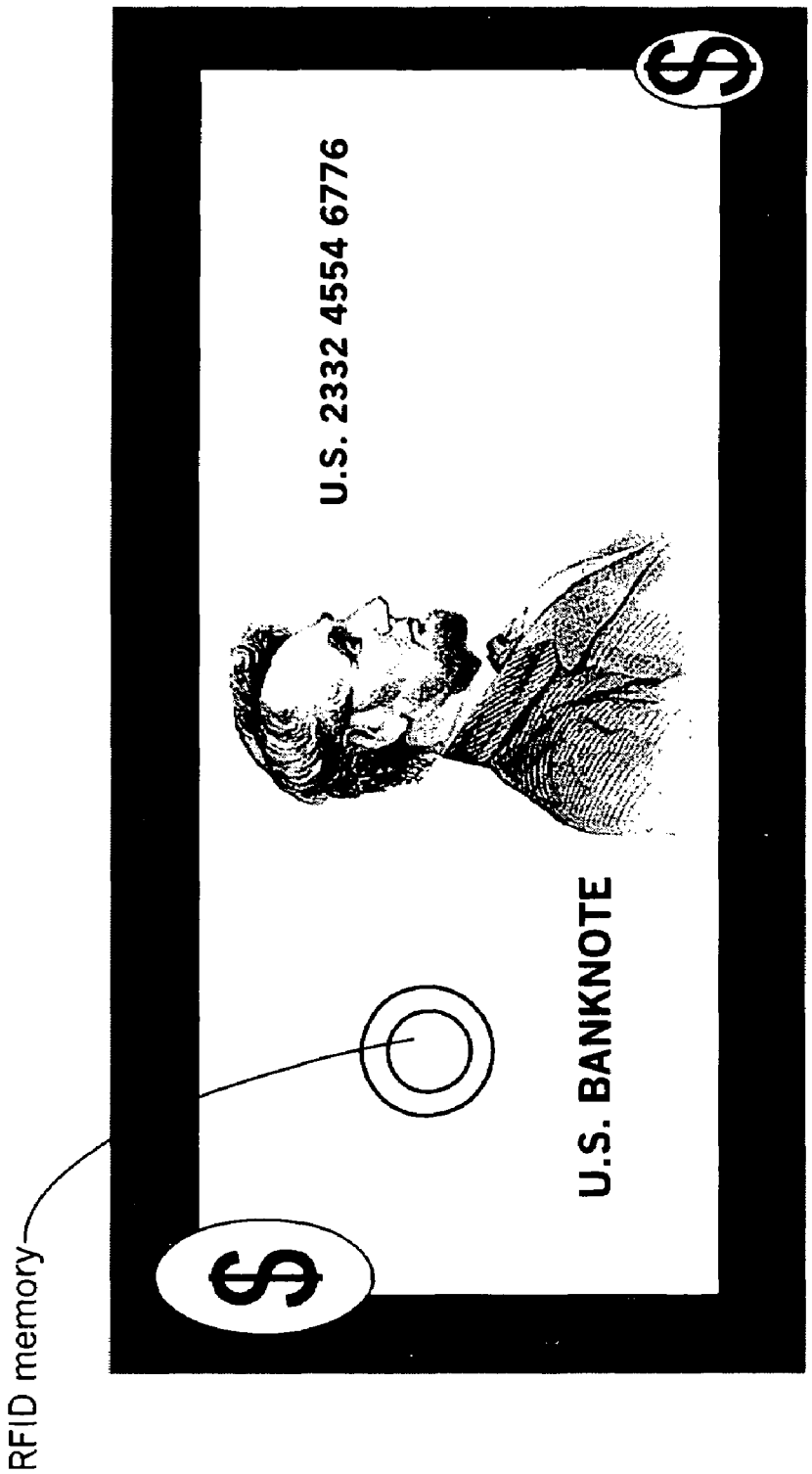

FIG. 1A discloses a preferred embodiment of a payment processing RFID system of the present invention comprising a wireless device (RFID memory that includes a unique customer record number), a stylus for capturing a biometric property during the signing process, a local processor-interrogator (for authenticating identity based upon comparison of the captured customer data with the reference customer data), and a host computer (for storing customer records and transaction records, and for generating monthly statements);

FIG. 1B discloses a second preferred embodiment of a payment processing RFID system of the present invention comprising a wireless device (RFID memory that reference biometric data, metric data, and signature data), a stylus for capturing a biometric property during the signing process, a local processor-interrogator (for authenticating identity based upon comparison of the captured customer data with the reference customer data), and a host computer (for storing transaction records, and for generating monthly statements);

FIG. 1C discloses a third preferred embodiment of a payment processing system of the present invention comprising a stylus for capturing a biometric property during the signing process, a smart card reader, a smart card, the smart card memory including reference biometric data, metric data, and signature data), identity authentication based upon comparison of the captured customer data with the reference customer data occurring in the smart card memory), and a host computer (for storing transaction records);

FIG. 1D discloses a fourth preferred embodiment of a payment processing RFID system of the present invention comprising a wireless device (RFID memory that includes a unique customer record number), a stylus for capturing a biometric property during the signing process, a local processor-interrogator (for collecting data from the wireless device and the stylus), and a host computer (for authenticating identity based upon comparison of the captured customer data with the reference customer data, for storing customer records and transaction records, and for generating monthly statements);

FIG. 2A discloses a preferred embodiment of a security RFID processing system of the present invention comprising a wireless device (RFID memory that includes a unique user record number), a stylus for capturing a biometric property during the signing process, a local processor-interrogator (for authenticating user identity based upon comparison of the captured customer data with the reference customer data), and a host computer (for storing security access codes and access requests);

FIG. 2B discloses a second preferred embodiment of a security RFID processing system of the present invention comprising a wireless device (RFID memory that includes a user biometric data, user metric data, and user signature data, and a unique user record number), a stylus for capturing a biometric property during the signing process, a local processor-interrogator (for authenticating user identity based upon comparison of the captured customer data with the reference customer data), and a host computer (for storing security access codes and access requests);

FIG. 3 discloses a preferred embodiment of a payment processing barcode system of the present invention comprising a wireless device (barcode memory that includes a unique customer record number), a stylus for capturing a biometric property during the signing process, a local processor-barcode reader (for authenticating identity based upon comparison of the captured customer data with the reference customer data), and a host computer (for storing customer records and transaction records, and for generating monthly statements);

FIG. 4 discloses a preferred embodiment of a system for processing a conventional payment for goods and service at a point-of-sale terminal, comprising a customer ID card (RFID memory that includes a unique customer record number), a user credit or debit card from which value is drawn to pay for goods or services, a stylus for capturing a biometric property during the signing process, a local processor-interrogator (for authenticating identity based upon comparison of the captured customer data with the reference customer data), and a host computer (for storing customer records and transaction records, and for generating monthly statements), the transaction being blocked if the ID card reference data does not match the biometric, metric, or signature data captured from the stylus;

FIG. 5A discloses a simplified logic diagram for a preferred method for registering new users into the access (account, network data, physical) security system of the present invention;

FIG. 5B discloses a simplified logic diagram for a preferred method for registering existing users into the access (account, network data, physical) security system of the present invention, the registration occurring dynamically as an on-site access request is being processed;

FIG. 6A discloses a simplified logic diagram for a preferred method for enabling account, network data, or physical access involving lower security identity authentication, two streams of sensed data being compared to two streams of reference data, access being enabled if either stream of sensed data matches a corresponding stream of reference data;

FIG. 6B discloses a simplified logic diagram for a preferred method for enabling account, network data, or physical access involving medium security identity authentication, one stream of sensed data being compared to a stream of reference data, access being enabled if the sensed data matches the reference data;

FIG. 6C discloses a simplified logic diagram for a preferred method for enabling account, network data, or physical access involving higher security identity authentication, two streams of sensed data being compared against two streams of reference data, access being enabled if and only if each stream of sensed data matches its corresponding stream of reference data;

FIGS. 7A and 7C disclose a simplified logic diagram for a preferred method for the security system of the present invention, enabling access to network data to a remote user involving higher security identity authentication a network high security request, where an acceptance threshold is adjusted (see FIGS. 18A and 18B), two streams of data being captured and processed, access being enabled if and only if each stream of sensed data matches its corresponding stream of reference data;

FIGS. 7B and 7C disclose a simplified logic diagram for a preferred method for the security system of the present invention, enabling access to network data to a remote user involving higher security identity authentication a network high security request, where an acceptance threshold is adjusted (see FIGS. 18A and 18B), two streams of data being captured and processed, access being enabled if and only if each stream of sensed data matches its corresponding stream of reference data, data misinformation being provided to the user if identity authentication is not confirmed;

FIG. 8 discloses a simplified logic diagram for another embodiment of the security system of the present invention, wherein the reference data is used for purposes of authenticating user identity for cashing a check;

FIG. 9 discloses a simplified logic diagram for a preferred method for enabling access to a secure area, the user carrying a wireless device having RFID memory, one stream of sensed data being compared to a stream of reference data, access being enabled if the sensed data matches the reference data;

FIGS. 10A and 11A disclose a preferred embodiment of simplified RFID memory and simplified customer record of the host computer for the payment processing system of FIG. 1A;

FIGS. 10BA and 11B disclose a preferred embodiment of simplified RFID memory and simplified customer record of the host computer for the payment processing system of FIG. 1B;

FIG. 12A discloses a preferred embodiment for the stylus of the security system of the present invention for providing images of any finger image that touches the grip area of the stylus, an ultrasonic sensor being positioned along the axis of the stylus, the sensor rotating to capture finger images (like sonar), providing a wrap-around sensor configuration for capturing fingerprint images;

FIG. 12B discloses another preferred embodiment for the stylus of the security system of the present invention for providing images of any finger image that touches the grip area of the stylus, six elongated silicon chip sensors being mounted about the surface of the grip, providing a wrap-around sensor configuration for capturing fingerprint images;

FIGS. 13A and 13B disclose exploded views of other preferred embodiments of wrap-around fingerprint sensor configurations, providing a wrap-around sensor configuration for capturing fingerprint images;

FIGS. 14A and 14B disclose a simplified user record data and a list of security access sites for use in a financial institution;

FIGS. 15A and 15B disclose a variation of a wireless stylus for use with the security access system of the present invention, the wireless stylus including a fingerprint sensor, a magnetic stripe, and a living hinge for opening and closing a pivotal flap where the magnetic stripe is positioned;

FIG. 16A discloses a customer identification device for the security access system of the present invention, the customer identification device being a card, wherein the card includes is an active transponder;

FIG. 16B discloses a customer identification device for the security access system of the present invention, the customer identification device being a card, wherein the card includes a magnetic stripe credit card;

FIG. 16C discloses a customer identification device for the security access system of the present invention, the customer identification device being a card, wherein the card includes a barcode;

FIG. 16D discloses a customer identification device for the security access system of the present invention, the customer identification device being a card with two memories, wherein one memory is the passive transponder and the second memory is the barcode;

FIG. 16E discloses a customer identification device for the security access system of the present invention, the customer identification device being a card with three memories, wherein one memory is the magnetic stripe, the second memory is a passive transponder, and the third memory is the barcode;

FIG. 16F discloses a customer identification device for the security access system of the present invention, the customer identification device being a card with two memories, wherein one memory is the magnetic stripe and the second memory is the barcode;

FIG. 17 discloses still another preferred embodiment of the wireless device of the present invention, the wireless device being commercial paper with RFID memory disposed therewithin, the memory enabling tracking of the commercial paper, and enabling identity authentication at transfer sites. For purposes of discussions herein, there are two types of RFID devices (1) a token that is issued to a party for use by that party; and (2) a token that is issued and can be readily and freely exchanged between parties (like currency). The latter may take the form of a plastic card, a paper note, or a coin.

Figure 18A:
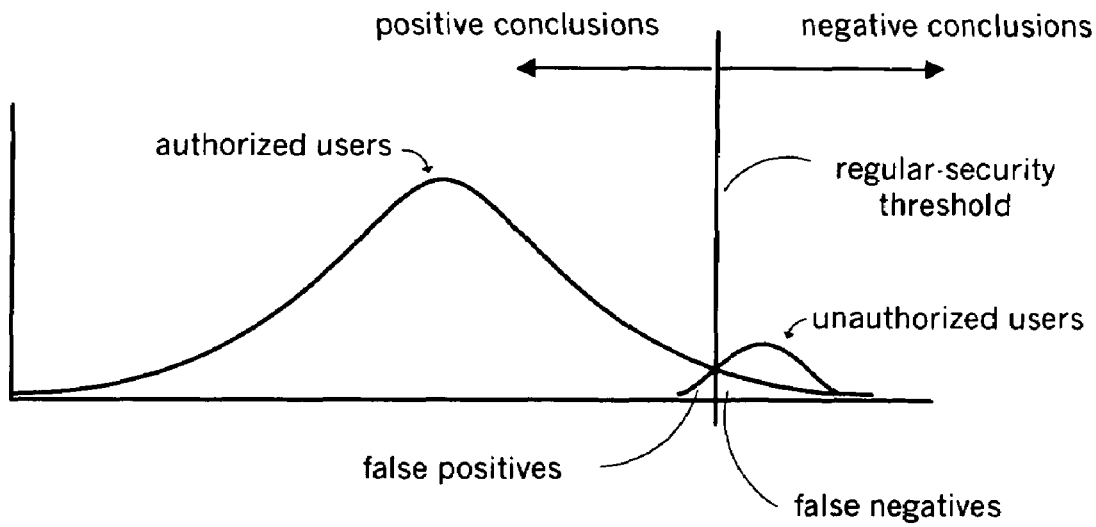
Figure 18B:
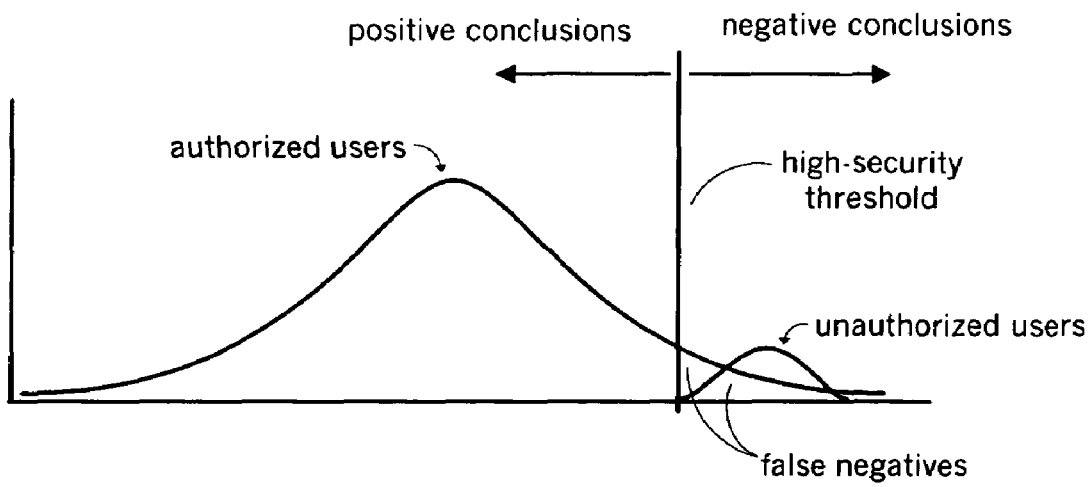

FIG. 18A discloses a simplified threshold graph for authenticating lower-risk commercial transactions; and FIG. 18B discloses a simplified threshold graph for authenticating higher-risk commercial transactions.

DETAILED DESCRIPTION OF THE PREFERRED EMBODIMENTS

Referring now to the drawings, FIGS. 1A, 1B, and 1C disclose generally the security access system of the present invention. The authenticated commercial transaction system comprises a wireless device carried by the customer, a device reader for accessing customer data through the wireless device, a device for generating an electronic signature, a sensor for capturing a digital signature during the course of the commercial transaction, a point-of-sale processor for processing electronic signature data and digital signature data from the device reader, and a host computer in digital communication with the point-of-sale processor.

The preferred embodiment of the identity verification system of the present invention is for accessing account data, for accessing network data, and for physical access. The host computer has access to data that links the customer with the customer's payment account. The interrogator is linked to the host computer disposed at the point-of-sale terminal. The transponder is wireless and is carried by the customer, and transmits data to the interrogator upon request. The data transmitted from the transponder enables the system to make an initial customer identification. The stylus is attached to the point-of-sale terminal and includes a sensor disposed in the stylus grip. The sensor captures and generates a digital signature of the customer while the customer signs his name. Access to the customer's payment account is only enabled after identity has been verified—by matching the digital and/or electronic signatures with the reference data previously submitted by the customer.

In the two-step process of the identity verification process of the present invention, customer identity is initially made by data transmitted from the transponder to the interrogator. The second step involves the capture of data used to generate digital and electronic signatures. Only after the captured data is compared against the reference data, will the transaction be allowed to proceed.

The method for authenticating a commercial transaction of the present invention comprises a customer approaching a point-of-sale terminal with goods to be purchased, the customer generating an electronic signature as an expression of intent to commit to the commercial transaction, capturing a digital signature of the customer when the electronic signature is being generated, comparing the captured digital signature of the customer against a reference digital signature, and approving the transaction whenever a predetermined threshold for the authentication has been met and the customer has sufficient funds to cover the transaction.

This identity authentication system is used in commercial transactions at a point-of-sale terminal. The customer registers advising the system of a customer account that is to be used for payment. The customer also submits an electronic signature (written script of name) and a digital signature for reference purposes—a fingerprint. The customer is then issued a wireless device, the wireless device having memory. The memory may be an ID card, a credit card, a smart card, a transponder, a barcode, or a combination of these memories. A identifying device reader (such as a card reader, an interrogator, a scanner) is located at the point-of-sale terminal that is compatible with the wireless device. Thereafter, when the customer uses a stylus to submit written data—an electronic signature is generated. Similarly, a sensor in the stylus captures data that is used to generate a digital signature. A reference print is then accessed through the memory in the wireless device carried by the customer. The digital and electronic signatures are then compared against the reference data to authentic identity.

FIGS. 2A and 2B disclose simplified methods for registration for new and existing customers, respectively. For a new customer, the customer record must be created. For an existing customer, the customer record already exists. One primary advantage of having the reference data in the customer record (rather than the transponder) is that the amount of memory available reference signature store is not a primary concern. When the reference signature data is to be stored within the transponder, the amount of memory within the transponder may not be sufficient to store such data. For the existing customer, the customer record is already in existence but a confirmation check is needed to confirm that the customer has authorized access to the account.

The method overcomes the inconvenience of having to re-register all existing customers, Existing customers can use a "dynamic registration" during a routine transaction. Digital and electronic signatures are captured during a routine commercial transaction, using the stylus. Thereafter, during a commercial transaction, the sensed print is compared to the reference print as part of the identity verification process whenever the card is submitted through a cardreader. Similarly, if a transponder is used, perhaps to buy gasoline and other items in a convenience store affiliated with the gas station, the stylus captures the digital signature and uses it as a reference print.

For example in a branch office of a bank, the styluses of the present invention are placed at all tellers' windows, all ATMs, and all officers' desks. New customers are given a debit/check/ATM card upon filling out an application. The customer uses a stylus similar to the styluses at the tellers' windows. The customer's reference print is captured during registration, preferably within a branch office of the bank and digital and electronic signature data is encrypted is stored in the customer's bank record. Such cards can actually be issued and distributed to customers once registration is completed, much the same as hotels use to issue room keys upon registration—the cards are preprinted and certain data is loaded onto the card prior to issuance.

The stylus can be attached to a point-of-sale terminal, attached to a pen-based computer, or a signature pad. In addition, the stylus can be wireless, whereby the transponder is incorporated into the wireless stylus (see FIGS. 1B and 1C). Each stylus also includes one or more fingerprint sensors that capture an image of a finger of the customer when the stylus is grasped.

The transponder responds to a radio signal by emitting its own radio signal. Each transponder is tagged with a unique serial number. That serial number can be linked with a credit or debit account. A typical sale may require a matching of digital signatures; require a matching of electronic signatures, and require a matching of both digital signatures and electronic signatures. The customer selects goods and proceeds to a point-of-sale terminal. The point-of-sale terminal indicates that the transaction will be paid through a transponder. An interrogator disposed at the point-of-sale terminal collects data from the transponder. A light advises the customer that the payment has been accepted. Payment is made instantly from the customer's registered account. The interrogator emits a low-frequency transmission, generally via its antenna. The transponder is inactive until it's activated by the interrogator. When a transponder passes within range, the transponder is excited, causing the transponder to transmit its data in response to the inquiry. The interrogator submits the inquiry to the transponder and receives back data from the transponder.

In one preferred embodiment, the transponder has enhanced memory (akin to a smart card), in which case the encrypted reference fingerprint is stored within the transponder memory. Also, the memory may contain account number, balance—and customer data to be stored in the transponder memory. FIG. 6A discloses the corresponding customer bank record. The comparison of the sensed print with the reference print for purposes of identity authentication preferably occurs in the transponder. One significant advantage to this system is that the transaction can be completed at the point-of-sale terminal with minimal access/input from the driver. Another advantage is that the driver and account data are updated after the transaction is completed In another preferred embodiment, the transponder has limited memory (akin to a magnetic stripe). The writing device is a tethered stylus attached to the point-of-sale terminal and the digital and electronic signatures are stored in the customer record. The customer bank and account number are in the transponder. The reference signatures are in the customer record at the customer bank. The comparison of the sensed signatures with the reference signatures for purposes of identity authentication preferably occurs either in the driver (where the sensed print is transmitted) or in the point-of-sale terminal (where the reference print is transmitted). In a variation of this embodiment, the transponder has an index reference to the customer bank and account number. For increased security the index reference number in the account index and on the transponder change with each transaction. The reference print is in the customer record at the customer bank. One significant advantage is that since there is minimal information on the transponder device, if the transponder is lost or stolen it is of little use to thieves and hacks. While they can locate the customer's bank and account number (which they can learn from a personal check), they cannot gain access to such funds since the digital and/or electronic signatures don't match. Another advantage is that the transmission of data is through wired connections (more secure).

A passive transponder (does not include a power supply) carried by the customer on his/her person is disposed in a card carried in a wallet or on a keychain—it may need to be removed and swiped through a cardreader or a near an interrogator. An active transponder (includes a power supply) can also be pda, jewelry, glasses, clothing, or the like.

A transponder of choice is commercially available from AMSKAN of Mulgrave, Victoria in Australia—the InfraRed Datalink allows serial "through the windscreen' data transfer between a vehicle and the roadside in daylight with high reliability and is presently used for capturing information from vehicles as they re-fuel, re-load, or at highway speeds. The IRD is comprised of two main components, the interrogator and the wireless transponder. The interrogator is mounted either at the point-of-sale terminal. The size of the transponder is 130×80×50 mm.

Another transponder of choice is Miotec's mPollux—that is developed on a SIM card and its integrated security solutions offer a flexible and secure platform with a sufficient capacity for a wireless PKI system. The SIM platform is a FLASH microcontroller, which has a separate RISC processor for RSA operations. MioCOS operating system is compliant with both GSM and PKI standards. Furthermore, the integrated biometric functions enable, among other things, replacing the PIN code in an electronic ID card with fingerprint matching.

In still yet another preferred embodiment of the pen-based verification systems of the present invention, a transponder is used in a smart card. The smart is compatible with both contactless and contact transactions. Such a card is presently commercially available and known as a "Digital Pusan Card." The Digital Pusan Card is one of the first to combine contact and contactless smart card functionality on a single chip. Supporting a wide array of services, it combines credit, debit and prepaid card functions. Compatible with smart pagers the card is used within the existing Hanaro Transportation scheme. Cardholders can recharge their e-purses at reloading machines and at ATMs.

As well as proven and secure dual interface technology, operating in both contact and contactless mode. The card is loaded by either its contact or contactless interface. This allows many recharging possibilities including at bank terminals, bus stations or, with a PC and card reader, over the Internet—and this also permits electronic purchasing via the Internet.

The use of this transponder as a component of the pen-based verification system of the present invention enables the transponder to be compatible with both card-based and cardless systems. In the card-based system, the device is swiped through a cardreader at the point-of-sale terminal—and the customer signs her name using the fingerprint stylus. The reference fingerprint image is stored in the smart card/transponder device, which is also where the matching of the sensed print (from the pen) is compared with the reference fingerprint image. This embodiment enabling compatibility with both cardreaders and transponders also is key in enabling a transition to a cardless system.

The preferred embodiment of the security access system of the present invention is compatible with the following systems:
   Fingerprint sensor in something other than stylus (card reader, point-of-sale counter, card)
   Stylus w/fingerprint sensors attached to point-of-sale
     Credit cards
     Stored value, ATM, check cards
     Reference print, Bank, and Account number in card, keytag, or wallet
     Bank and Account number in card, keytag or wallet
     Personal identifier in card, keytag, or wallet
   Smart-Pen w/fingerprint sensors attached to point-of-sale
     Credit cards
     Stored value, ATM, check cards
     Reference print, Bank, and Account number in card, keytag, or wallet
     Bank and Account number in card, keytag or wallet
     Personal identifier in card, keytag, or wallet
   Wireless Smart-Pen w/fingerprint sensors carried by customer
     Reference print, Bank, and Account number in smart-pen
     Bank and Account number in smart-pen Personal identifier in smart-pen When wireless devices are used, system security becomes even more of a concern, since an integral part of the system, in this instance the transponder, is not attached to the system, but rather is wireless and carried by a customer. The reference digital and electronic signature data is stored in both the transponder and the customer record. During a request for a point-of-sale transaction, a comparison of the reference data on the transponder is compared with the reference data in the customer record to determine if the transponder has been altered or replaced with a counterfeit transponder. This check need not be done each time but either randomly or in the event that the transaction involves a large value amount. There are other ways. When the reference print is stored inside a transponder that is carried by the customer, either of the following technologies may also be employed:

- U.S. Pat. No. 5,619,025 (Hickman, et al.) discloses a method for tamper-proof identification using photo refractive crystals. The method for document authentication exploits a temporally variable physical process to generate a reproducible effect that cannot be copied. A document such as a credit card is provided with a spot or stripe that incorporates at least one, and preferably a large plurality of photo refractive crystals arrayed in a random manner. The document authenticating apparatus includes a coherent light source such as a diode laser to illuminate the photo refractive crystals, and a photosensor to receive light scattered from the photo refractive crystals. The random distribution and orientation of photo refractive crystals comprises a unique characteristic for each card or document, and this characteristic is not based on any assigned number or code. The response of photo refractive crystals to the coherent illumination comprises a time-varying characteristic that is dependent upon the intensity and temporal nature of the illumination itself. Input to the laser illuminator may be varied to elicit differing responses from the photo refractive crystals, and this factor may be very difficult for a counterfeiter to ascertain. Also, for any given illumination intensity or temporal pattern, the image received by the photosensor varies with time. The time at which the photosensor signal is sampled to obtain an identifying image may also be varied, thereby further compounding the difficulty for a counterfeiter to overcome. A large number of "snapshots" of the time-varying image of the document is electronically captured, digitized, and stored in an electronic media. The photosensor signal is compared to the stored data; a match indicates a valid document, and no match indicates an invalid or unauthorized document. The image recognition process can be enhanced by comparing the rate of change in a sequence of images elicited by the laser illuminator.
- U.S. Pat. No. 5,834,748 (Litman) discloses a card that includes magnetic particles and is difficult to counterfeit. The signal strength, period, amplitude and/or alignment of the magnetic field may be read as coded information by a magnetic reading head. The encoding of this information can be made increasingly difficult to imitate or forge by varying parameters within these (and other) mechanically readable inscriptions. The apparatus readable (mechanically readable) security means to prevent forgery of identification cards, (including the new smart cards with readable chips therein) and pens. The security of the pens is enhanced by the implementation of a mechanically readable security system, which includes a mechanically readable magnetic marking embedded in the transactional item. The marking also may be visually notable or readable, but it at least must be readable by a reading head capable of reading the passage of a magnetic material by the head. The marking is preferably in the form of at least two magnetic filaments or strips and preferably includes a multiple number of filaments of differing coerciveness, magnetic field strength, magnetic field alignment, size or spacing so that when the stylus is passed at a defined and preferably constant speed through the reading device, approval will be given only when the proper signal is provided by the ordered array of appropriate magnetic elements in the pen.

When the digital signature is generated through fingerprint data, registration can also occur without the pen, but rather with a fingerprint sensor that captures essentially a complete fingerprint of the finger for references purposes. Subsequently, when the stylus is used, the partial print is compared to the complete fingerprint for matching purposes.

Just as a transponder that is compatible with existing cardreaders enables the system of the present invention to be compatible with card-based systems and pen-based (cardless) systems as shown above, utilization of a stylus that is compatible with existing cardreaders offers many similar advantages for a wireless stylus, that is compatible with card-based systems and pen-based systems. FIGS. 15A and 15B disclose a first preferred embodiment of a stylus grip for use with the identity authentication system of the present invention, the grip having a rotatable flap that includes a magnetic stripe that can be read by a conventional card reader.

The fingerprint sensors of choice are either of the following:

The FingerTIP™ sensor from Infineon enables the integration of a miniature fingerprint sensor into a wide variety of end-products including PCs, notebook computers, handheld devices, set-top boxes, ATM's, point of sale terminals, ticketing kiosks, building access systems, or any other application that would benefit from replacing PIN and password identification with biometric-based verification. The chip is compact, reliable and robust enough to convert a previously exotic technology-biometric user ID into an everyday reality. The FingerTIP chip is a small (18 mm×21 mm×1.5 mm) IC embedding a 288×224 pixel contact sensor array that images the lines and ridges of a human fingerprint when a user touches the device. Each pixel has an 8-bit data depth, enabling evaluation of subtle gradations (256 shades of gray) of a fingertip and their translation into a set of indices—the key identifying features of an individual fingerprint. Imaging and data transfer of an impression takes only 100 milliseconds.

STMicroelectronics has developed a fingerprint sensor of substantially the same size as the Infineon sensor and that use capacitive-sensor-array technology; building silicon IC's containing an array of sensor plates. ST's TouchChip technology uses a capacitive sensing technique to capture, in less than one tenth of a second, a high-resolution image of a fingerprint when the finger is applied directly to the chip surface. The output of the chip is a digital representation of the fingerprint, which can be processed by the algorithms developed by 5AGEM, which immediately confirm or invalidate the recognition of pre-identified persons and then be further processed by application-dependent software.

A transponder of choice is commercially available from AMSKAN of Mulgrave, Victoria in Australia—the InfraRed Datalink allows serial "through the windscreen' data transfer between a vehicle and the roadside in daylight with high reliability and is presently used for capturing information from vehicles as they re-fuel, re-load, or at highway speeds. The IRD is comprised of two main components, the interrogator and the wireless transponder. The interrogator is mounted either at the point-of-sale terminal. The size of the transponder is 130×80×50 mm.

Another transponder of choice is Miotec's mPollux—that is developed on a SIM card and its integrated security solutions offer a flexible and secure platform with a sufficient capacity for a wireless PKI system. The SIM platform is a FLASH microcontroller, which has a separate RISC processor for RSA operations. MioCOS operating system is compliant with both GSM and PKI standards. Furthermore, the integrated biometric functions enable, among other things, replacing the PIN code in an electronic ID card with fingerprint matching.

One skilled in the art will also recognize the application of the principles of the identity verification system of the present invention to electronic commerce, where the party seeking to enter or access data, or simple to correspond with another. When the party seeking to make the transaction is remote from the host computer terminal (or second party), the remote party can generally not be seen, and so the race, ethnicity, gender, or even species cannot be ascertained. In such instances, the need for identity verification takes on increased importance. Accordingly, the identity verification process of the present invention requires that the remote party have access to a signature pad—the signature pad having means to generate a digital and an electronic signature. The digital and/or electronic signatures compared against reference data before allowing the transaction to go forward, and the digital and electronic signatures are captured and preserved in a transaction record.

Throughout this application, various U.S. Patents, Patent Applications, and PCT Applications are referenced by number and inventor. The disclosures of these Patents and Applications in their entireties are hereby incorporated by reference into this specification in order to more fully describe the state of the art to which this technology pertains.

It is evident that many alternatives, modifications, and variations of the security authentication method and system of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

The invention claimed is:

1. A method for processing an access request, the method comprising:
 a. capturing user reference data from a wireless device carried by a user, the user reference data including user biometric data or user metric data, the user reference data having been submitted during user registration;
 b. capturing user sensed data as the user writes a name, the name being written with a stylus, the user sensed data including user biometric data or user metric data;
 c. transmitting the user sensed data and the user reference data to a processor, the user reference data being transmitted to the processor by means of radio-frequency transmission;
 d. comparing the user sensed data against the user reference data in the processor;
 e. authenticating the identity of the user based upon the results of the comparison; and
 f. enabling user access to an account, a network, or a physically secure location if the processor confirms user identity and other system criteria confirms the access request should be approved the other system criteria being fund availability, network clearance, or physical clearance, respectively.

2. A method for processing an access request, the method comprising:
 a. capturing a user record number from a wireless device carried by a user, the user record number having been submitted in a registration process;
 b. capturing user sensed data as the user writes a name, the user sensed data including user biometric data or user metric data, the name being written with a stylus;
 c. transmitting the user sensed data and the user record number to a processor system, the user record number being transmitted to the processor by means of radio-frequency transmission;
 d. using the user record number to retrieve user reference data, the user reference data including user biometric data, user metric data, or user signature data;
 e. comparing tile user sensed data with the user reference data in the processor;
 f. authenticating the identity of the user based upon the results of the comparison; and
 g. enabling user access to an account, a network, or a physically secure location if the processor confirms user identity and other system criteria confirms the access request should be approved the other system criteria being fund availability, network clearance, or physical clearance, respectively.

3. A method for processing an access request, the method comprising:
 a. capturing user reference data involving user biometric data or user metric data from a wireless device carried by a user, the user reference data being embedded in a barcode, the user reference data having been submitted in a registration process;
 b. capturing user sensed data as the user writes a name, the name being written with a stylus, the user sensed data including user biometric data or user metric data;
 c. transmitting the user sensed data and the user reference data to a processor system, the user reference data being transmitted to the processor by means of a barcode reader;
 d. comparing the user sensed data against the user reference data in the processor;
 e. authenticating the identity of the user based upon the results of the comparison; and
 f. enabling user access to an account, a network, or a physically secure location if the processor confirms user identity and other system criteria confirms the access request should be approved the other system criteria being fund availability, network clearance, or physical clearance, respectively.

4. A method for processing an access request, the method comprising:
 a. capturing a user record number from a wireless device carried by a user, the user record number being embedded in a barcode having been submitted in a registration process;

b. capturing user sensed data as the user writes a name, the name being written with a stylus, the user sensed data including user biometric data or user metric data;
c. transmitting the user sensed data and the user record number to a processor system, the user record number being transmitted to the processor by means of a barcode scanner;
d. using the user record number to retrieve user reference data, the user reference data including user biometric data, user metric data, or user signature data;
e. comparing the user sensed data with the user reference data in the processor;
f. authenticating the identity of the user based upon the results of the comparison; and
g. enabling user access to an account, a network, or a physically secure location if the processor confirms user identity and other system criteria confirms the access request should be approved, the other system criteria being fund availability, network clearance, or physical clearance, respectively.

5. A method for enabling a user to process a payment for goods or services from a provider, the method comprising:
a. tendering funds sufficient to pay for the goods or services, fund tendering being by a payment card and through a cardreader;
b. capturing user reference data involving user biometric data or user metric data from a wireless device carried by the user, the wireless device being separate and apart from the payment card, the user reference data having been submitted in a registration process;
c. capturing user sensed data, the user sensed data including user biometric data or user metric data;
d. transmitting the user sensed data and the user reference data to a processor system, the user reference data being transmitted to the processor by means of radio-frequency transmission;
e. comparing the user sensed data against the user reference data; and
f. advising the provider of the goods or services when user identity is denied resulting from the comparison of the user sensed data with the user reference data.

6. A method for processing an access request, the method comprising:
a. capturing user sensed data as the user writes a name, the name being written with a stylus, the user sensed data including user biometric data or user metric data;
b. transmitting the user sensed data to a smart card, the smart card including a smart-card processor, the smart-card processor including memory, the memory including user reference data, the user reference data including user biometric data or user metric data;
c. comparing the user sensed data against the user reference data in the smart-card processor;
d. authenticating the identity of the user based upon the results of the comparison; and
e. enabling user access to an account, a network, or a physically secure location if the processor confirms user identity and other system criteria confirms the access request should be approved the other system criteria being fund availability, network clearance, or physical clearance, respectively.

* * * * *